US011889172B2

(12) United States Patent
Kwon et al.

(10) Patent No.: US 11,889,172 B2
(45) Date of Patent: Jan. 30, 2024

(54) REFLECTIVE MODULE ASSEMBLY AND CAMERA MODULE INCLUDING THE SAME

(71) Applicant: SAMSUNG ELECTRO-MECHANICS CO., LTD., Suwon-si (KR)

(72) Inventors: Young Hwan Kwon, Suwon-si (KR); Soon Seok Kang, Suwon-si (KR); Nam Ki Park, Suwon-si (KR); Young Bok Yoon, Suwon-si (KR); Oh Byoung Kwon, Suwon-si (KR); Jae Won Jung, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 17/530,700

(22) Filed: Nov. 19, 2021

(65) Prior Publication Data

US 2022/0210299 A1 Jun. 30, 2022

(30) Foreign Application Priority Data

Dec. 28, 2020 (KR) ........................ 10-2020-0184682
Jan. 29, 2021 (KR) ........................ 10-2021-0013274
Mar. 25, 2021 (KR) ........................ 10-2021-0039059

(51) Int. Cl.
*H04N 23/55* (2023.01)
*H04N 23/54* (2023.01)
*H04N 23/51* (2023.01)

(52) U.S. Cl.
CPC ............. *H04N 23/55* (2023.01); *H04N 23/51* (2023.01); *H04N 23/54* (2023.01)

(58) Field of Classification Search
CPC ... H04N 5/2254; H04N 5/2252; H04N 5/2253
See application file for complete search history.

(56) References Cited

U.S. PATENT DOCUMENTS

2015/0002683 A1   1/2015  Hu et al.
2020/0174270 A1   6/2020  Enta et al.
(Continued)

FOREIGN PATENT DOCUMENTS

JP         2015-11353 A       1/2015
KR    10-2019-0071569 A       6/2019
(Continued)

OTHER PUBLICATIONS

Korean Office Action dated May 3, 2022, in counterpart Korean Patent Application No. 10-2021-0039059 (8 Pages in English, 5 pages in Korean).

*Primary Examiner* — Sinh Tran
*Assistant Examiner* — Zhenzhen Wu
(74) *Attorney, Agent, or Firm* — NSIP Law

(57) ABSTRACT

A reflective module assembly include a housing having an internal space, a first reflective module provided in the housing to change a path of incident light, and a second reflective module provided in the housing to change a path of light emitted from the first reflective module. The first reflective module includes a first reflective member rotatable about a first axis formed by at least two first ball members. The second reflective module includes a second reflective member rotatable about a second axis, perpendicular to the first axis and passing through a rotation axis ball provided at the second reflective module.

19 Claims, 20 Drawing Sheets

(56) References Cited

U.S. PATENT DOCUMENTS

| | | | |
|---|---|---|---|
| 2020/0218082 A1 | 7/2020 | Choi et al. | |
| 2020/0363626 A1* | 11/2020 | Seo | G03B 30/00 |
| 2020/0400464 A1* | 12/2020 | Yedid | H01F 7/0289 |
| 2021/0286193 A1 | 9/2021 | Kwon et al. | |
| 2022/0011555 A1* | 1/2022 | Weng | G02B 7/1805 |
| 2022/0030168 A1* | 1/2022 | Chang | H04N 5/2254 |
| 2022/0272238 A1* | 8/2022 | Jang | H04N 23/57 |
| 2022/0294945 A1* | 9/2022 | Zhao | G03B 17/17 |

FOREIGN PATENT DOCUMENTS

| | | |
|---|---|---|
| KR | 10-2019-0136083 A | 12/2019 |
| KR | 10-2020-0086482 A | 7/2020 |
| KR | 10-2131597 B1 | 8/2020 |
| KR | 10-2021-0000069 A | 1/2021 |
| KR | 10-2021-0116163 A | 9/2021 |
| WO | WO 2019/117652 A1 | 6/2019 |

\* cited by examiner

REFLECTIVE MODULE ASSEMBLY AND CAMERA MODULE INCLUDING THE SAME

CROSS-REFERENCE TO RELATED APPLICATIONS

This application claims the benefit under 35 USC 119(a) of Korean Patent Application Nos. 10-2020-0184682 filed on Dec. 28, 2020, 10-2021-0013274 filed on Jan. 29, 2021, and 10-2021-0039059 filed on Mar. 25, 2021, in the Korean Intellectual Property Office, the entire disclosures of which are incorporated herein by reference for all purposes.

BACKGROUND

1. Field

The present disclosure relates to a reflective module assembly and a camera module including the same.

2. Description of the Background

Camera modules may be installed in portable electronic devices such as tablet personal computers (PCs), laptop PCs, and the like, as well as in smartphones. An autofocusing (AF) function, an optical image stabilization (OIS) function, a zoom function, and the like, may be implemented in camera modules for mobile terminals.

In addition, a camera module may be provided with an actuator, directly moving a lens module, or indirectly moving a reflective module including a reflective member, to correct shake. In general, an actuator may move a lens module or a reflective module in a direction, intersecting an optical axis, with driving force generated by a magnet and a coil.

Recently, there has been increasing demand for image or video capturing. In the related art, it may be difficult to precisely correct shake which may constantly occur during video capturing.

In addition, when a subject to be captured moves during video capturing, there may be an inconvenience, in that a user should directly move a mobile communications terminal to set an image capturing direction of a camera module to the moving subject, and it may be difficult to accurately capture a video.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a reflective module assembly includes a housing having an internal space, a first reflective module disposed in the housing configured to change a path of incident light, and a second reflective module disposed in the housing configured to change a path of light emitted from the first reflective module. The first reflective module includes a first reflective member rotatable about a first axis formed by at least two first ball members. The second reflective module includes a second reflective member rotatable about a second axis, perpendicular to the first axis and passing through a rotation axis ball disposed at the second reflective module.

The first reflective module may include a first holder and the first reflective member may be disposed on the first holder. The at least two first ball members may be disposed between the first holder and the housing to rotatably support the first holder about the first axis. The second reflective module may include a second holder and the second reflective member may be disposed on the second holder. The rotation axis ball may be disposed between the second holder and the housing to rotatably support the second holder about the second axis.

The housing may include a first support portion. The first holder may include a second support portion disposed on both side portions of the first holder in a direction of the first axis and disposed to face the first support portion. The at least two first ball members may be disposed between the first support portion and the second support portion to rotatably support the first holder.

The first support portion may include a first guide portion supporting the at least two first ball members. The second support portion may include a second guide portion supporting the at least two first ball members in a position facing the first guide portion. At least one of the first guide portion and the second guide portion may be provided with an internal wall inclined to support the at least two first ball members at three or more points.

The housing may include a third guide portion supporting the rotation axis ball. The second holder may include a fourth guide portion supporting the rotation axis ball in a position facing the third guide portion. At least one of the third guide portion and the fourth guide portion may include an internal wall inclined to support the rotation axis ball at three or more points.

The second reflective module may include guide balls disposed between the housing and the second holder to guide rotation of the second holder.

The housing may include a fifth guide portion supporting the guide balls. The second holder may include a sixth guide portion supporting the guide balls in a position facing the fifth guide portion. The guide balls may move in a rolling motion in at least one of the fifth guide portion and the sixth guide portion to guide rotation of the second holder.

At least one of the fifth guide portion and the sixth guide portion may have a shape of an arc corresponding to a rotation path of the second holder.

At least one of the fifth guide portion and the sixth guide portion may have an internal wall inclined to support the guide balls at two or more points.

A first magnet may be disposed on both side surfaces of the first holder in a direction of the first axis. A first coil may be disposed on an internal sidewall of the housing facing the first magnet, and the first holder may be configured to be rotated about the first axis by an interaction of the first magnet and the first coil.

A second magnet may be disposed on one surface of the second holder. At least one second coil may be disposed on a lower surface of the housing facing the second magnet, and the second holder may be configured to be rotated about the second axis by an interaction between the second magnet and the second coil.

The second magnet may include one or more N-poles and one or more S-poles alternately magnetized in a rotational direction of the second holder.

The reflective module assembly may further include a blocking member disposed between the first reflective module and the second reflective module to block a portion of incident light.

In another general aspect, a reflective module assembly includes a first reflective member rotatable about a first axis and configured to change a path of incident light, and a second reflective member rotatable about a second axis and configured to change a path of light emitted from the first reflective member. The first reflective member is supported by first spheres forming the first axis, and the second reflective member is supported by second spheres forming the second axis. The number of the first spheres, forming the first axis, is different from the number of the second spheres forming the second axis.

A camera module may include the reflective module assembly, a lens module comprising a plurality of lenses and configured to allow light, emitted from the second reflective member, to pass therethrough, and an image sensor on which the light passed through the lens module is incident.

The first axis may be parallel to an optical axis of the lens module, and the second axis may intersect the optical axis of the lens module.

In another general aspect, a reflective module assembly includes a housing, a first reflective member disposed in the housing and rotatable about a first axis, and a second reflective member disposed in the housing and configured to change a path of light emitted from the first reflective member and rotatable about a second axis perpendicular to the first axis, wherein the first reflective member and the second reflective member are supported in the housing in a direction parallel to the second axis on a same inside surface of the housing.

Two or more first ball members may form the first axis, and the second axis may pass through a rotation axis ball.

The first reflective member may be disposed in a first holder including a second support portion disposed on both side portions of the first holder in a direction of the first axis and disposed to face the first support portion. The two or more first ball members may be disposed between the first support portion and the second support portion to rotatably support the first holder.

A camera module may include the reflective module assembly, a lens module comprising a plurality of lenses and configured to receive light emitted from the second reflective member, and an image sensor configured to receive light emitted from the lens module and convert the received light into an electrical signal.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
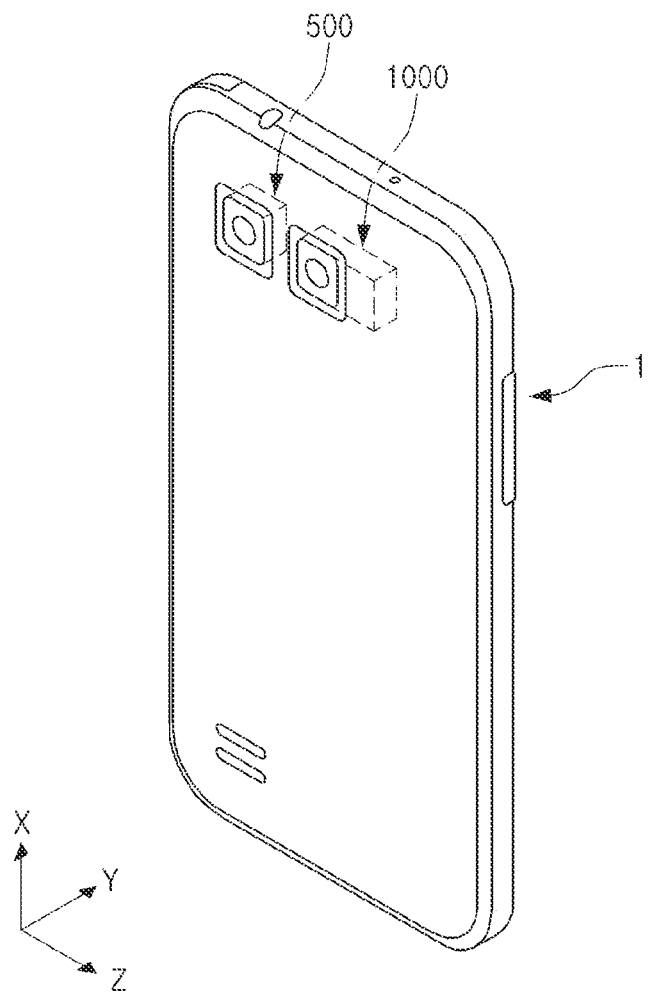
FIG. 1 is a perspective view of a portable electronic device according to one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after gaining an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

It will be understood that when an element or layer is referred to as being "on," "connected to," or "coupled to" another element or layer, it can be directly on, directly connected to, or directly coupled to the other element or layer, or intervening elements or layers may be present. In contrast, when an element or layer is referred to as being "directly on," "directly connected to," or "directly coupled to" another element or layer, there are no intervening elements or layers present.

Hereinafter, while embodiments of the present disclosure will be described in detail with reference to the accompanying drawings, it is noted that examples are not limited to the same.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of this disclosure. Further, although the examples described herein have a variety of configurations, other configurations are possible as will be apparent after an understanding of this disclosure.

Herein, it is noted that use of the term "may" with respect to an embodiment or example, for example, as to what an embodiment or example may include or implement, means that at least one embodiment or example exists in which such a feature is included or implemented while all examples and embodiments are not limited thereto.

An aspect of the present disclosure is to provide a reflective module assembly, which may easily correct user hand-shake during still image capturing or video capturing, and a camera module including the same.

Another aspect of the present disclosure is to provide a reflective module assembly, which may track a moving subject and may correct shake, and a camera module including the same.

FIG. 1 is a perspective view of a portable electronic device 1 according to one or more embodiments. The portable electronic device 1 may be a mobile communications terminal, a smartphone, a tablet personal computer (PC), or the like.

As illustrated in FIG. 1, one or more camera modules 500 and 1000 may be mounted in the portable electronic device 1 to capture a subject. For example, the portable electronic device may include a first camera module 1000 and a second camera module 500.

When two or more camera modules are provided, a plurality of camera modules may be disposed on some surfaces of a portable electronic device in various manners. For example, as illustrated in FIG. 1, the first camera module 1000 and the second camera module 500 may be sequentially disposed on one surface of the portable electronic device 1 in a width direction (a relatively short side direction). However, this is only an example, and the first camera module 1000 and the second camera module 500 may be sequentially disposed in a length direction (a relatively long side direction) of the portable electronic device 1.

When two or more camera modules 500 and 1000 are used, incident holes through which light is incident on the two or more camera modules 500 and 1000 may be disposed as close to each other as possible.

Figure 2:
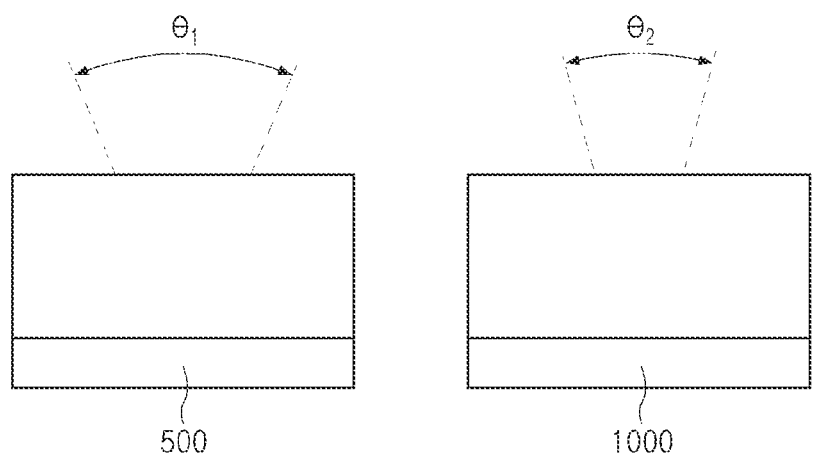
FIG. 2 is a reference view illustrating an example of an image capturing field of view of a plurality of camera modules installed in a portable electronic device according to one or more embodiments.

FIG. 2 is a reference view illustrating an example of an image capturing field of view of a plurality of camera modules 500 and 1000 installed in a portable electronic device according to one or more embodiments.

As illustrated in FIG. 2, a first camera module 1000 and a second camera module 500 may be configured to have different fields of view. For example, the first camera module 1000 illustrated in the right drawing of FIG. 2 may be configured to have a relatively narrow field of view (for example, a telephoto camera), and the second camera module 500 illustrated in the left drawing of FIG. 2 may be configured to have a relatively wide field of view (for example, a wide-angle camera). The first camera module 1000 may correspond to a camera module to be described later with reference to FIGS. 4 to 11. As an example, a field of view $\theta 1$ of the first camera module 1000 may be within a range of 9° to 35°, and a field of view $\theta 2$ of the second camera module 500 may be within a range of 60° to 120°. As described above, the fields of view of the two camera modules may be designed to be different from each other, so that an image of a subject may be captured with various fields of view.

The portable electronic device 1 according to embodiments may have a picture-in-picture (PIP) function. As an example, the portable electronic device 1 may display an image, captured by a camera module having a narrower field of view (for example, the first camera module 1000), in a region of an image captured by a camera module having a wider field of view (for example, the second camera module 500). For example, a subject of interest may be captured with a narrow field of view (resulting in an effect of magnifying the subject of interest), and may then be displayed in an image captured with a wide field of view.

Since a subject of interest may move during video image capturing, a camera module having a narrower field of view (for example, the first camera module 1000) may include a reflective module (a folded module) rotated to capture a video along the movement of the subject of interest. Accordingly, light incident on the first camera module 1000 may be reflected by a reflective member of the reflective module, and the reflected light may be incident on a lens module after an optical path is changed.

For example, the first camera module 1000 may rotatably move the reflection module to track the movement of the subject of interest. As an example, the reflection module provided in the first camera module 1000 may be rotated about a first axis (for example, a Z-axis) or a second axis (for example, a Y-axis). Accordingly, the first camera module 1000 may correct shake which may occur during video capturing. The first axis (the Z-axis) and the second axis (the Y-axis) may refer to axes perpendicular to each other.

Figure 3:
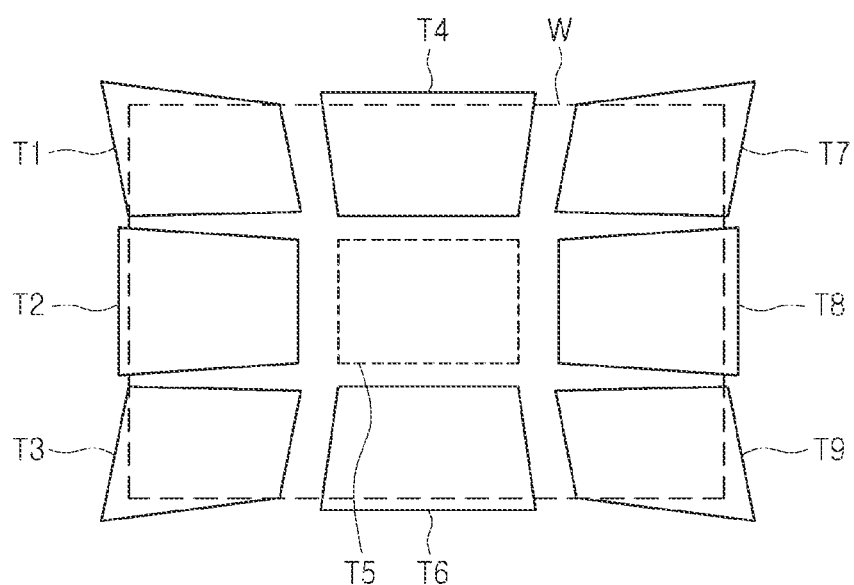
FIG. 3 is a reference view illustrating screen captures from a plurality of camera modules installed in a portable electronic device according to one or more embodiments.

FIG. 3 is a reference view illustrating screen captures from a plurality of camera modules installed in a portable electronic device according to one or more embodiments.

As illustrated in FIG. 3, the first camera module (1000 of FIG. 1) and the second camera module (500 of FIG. 1), installed in the portable electronic device (1 of FIG. 1) according to the embodiments, may be different in range of capturable regions. For example, the second camera module (500 of FIG. 1) having a relatively wide field of view may capture a subject having a relatively large area, and the first camera module (1000 of FIG. 1) having a relatively narrow field of view may capture a subject having a relatively small area. In particular, the first camera module (1000 of FIG. 1) may capture an internal region having a wide image capturing range W, captured by the second camera module (500 of FIG. 1), in tele-image capturing ranges T1 to T9. Such an image (video), captured in the tele-image capturing ranges T1 to T9, may be displayed within the image (video) captured in the wide image capturing range W. Of course, the first camera module (1000 of FIG. 1) may image a portion of an internal region of the wide image capturing range W to overlap an outside within the tele-image capturing ranges T1 to T9, or may image an external region of the wide image capturing range W.

The first camera module (1000 of FIG. 1) is provided with a plurality of reflective modules (folded modules) rotating about the first axis (the Z-axis) or the second axis (the Y-axis) to change a path of incident light. Therefore, an image capturing angle of an image (video), captured by the first camera module (1000 of FIG. 1), may be changed by rotation of a plurality of reflective modules about the first axis (the Z-axis) or the second axis (the Y-axis) to distort the captured image. For example, among the tele-image capturing ranges T1 to T9, illustrated in the reference view of FIG. 3, T1 to T4 and T6 to T9 represent the case in which an image is distorted by rotation of a reflective module. Accordingly, the camera module (500 or 1000 of FIG. 1) or a portable electronic device may correct at least one of the tele-image capturing ranges T1 to T9, imaged by the first camera module (1000 of FIG. 1), to convert the captured image into a distortion-free normal image. For example, the camera module (500 or 1000 of FIG. 1) or the portable electronic device may correct an image within T1 to T4 or T6 to T9, captured by the first camera module (1000 of FIG. 1), into an image having a rectangular shape, such as an image of T5. Such a correction may include image cropping or rectification using software. To implement such a function, the camera module (500 or 1000 of FIG. 1) or the portable electronic device may include a controller for editing or correcting an image.

The first camera module (1000 of FIG. 1) may include at least one reflective module assembly, and the reflective module assembly may include two or more reflective modules.

Hereinafter, a reflective module assembly including two or more reflective modules and a camera module including the reflective module assembly will be described in detail with reference to FIGS. 4 to 12.

Figure 4:
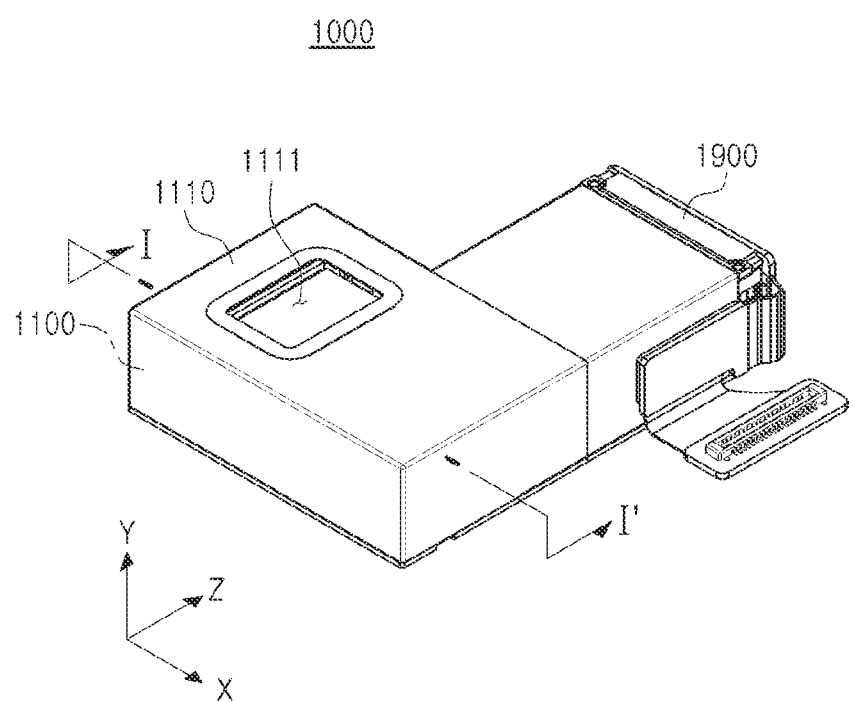
FIG. 4 is a perspective view of a camera module according to one or more embodiments.
Figure 5:
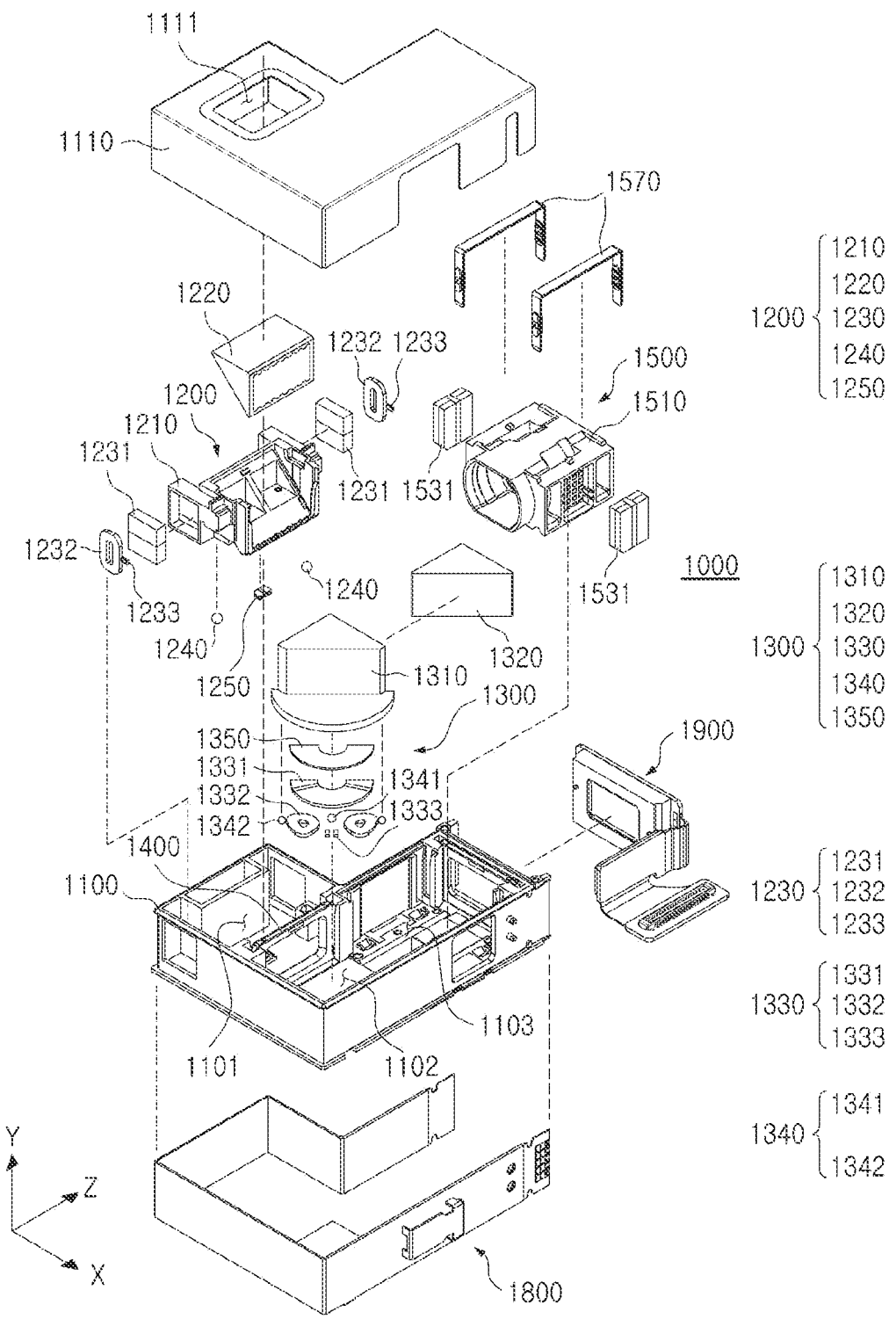
FIG. 5 is an exploded perspective view of a camera module according to one or more embodiments.

FIG. 4 is a perspective view of a camera module 1000 including a reflective module assembly according to one or more embodiments, and FIG. 5 is an exploded perspective view of the camera module 1000 including a reflective module assembly according to one or more embodiments. In the following description, the 'camera module 1000' refers to the first camera module (1000 of FIG. 1) described above with reference to FIGS. 1 to 3, unless otherwise specified. In addition, in the following description, the 'camera module 1000' refers to a camera module including a reflective module assembly according to one or more embodiments, unless otherwise specified.

Referring to FIGS. 4 and 5, the camera module 1000 according to embodiments may include at least one reflective module assembly, a lens module 1500, and an image sensor unit 1900. The reflective module assembly may include a plurality of reflective modules (folded modules) 1200 and 1300. In FIG. 5, the camera module 1000 is illustrated as having an integrated housing, but this is only an example and an entire camera module 1000 may be manufactured by coupling a sub-housing, in which a lens module (for example, 1500 of FIG. 5) and an image sensor unit (for example, 1900 of FIG. 5) are mounted, and a reflective module assembly according to embodiments (for example, a reflective assembly module including 1200 and 1300 of FIG. 5) to each other.

For example, the camera module 1000 may be manufactured by coupling the lens module 1500 and the image sensor unit 1900 to the reflective module assembly according to the embodiments. Therefore, in the descriptions of FIGS. 1 to 12, embodiments will be described based on the camera module 1000. However, since the first reflective module (1200 of FIG. 5), the second reflective module (1300 of FIG. 5), and a blocking member (1400 of FIG. 5) are equally included in a reflective module assembly according to embodiments, the first reflective module (1200 of FIG. 5), the second reflective module (1300 of FIG. 5), and the blocking member (1400 of FIG. 5) may be equally applied to the reflective module assembly according to embodiments.

Continuing to refer to FIGS. 4 and 5, the camera module 1000 according to embodiments may include a plurality of reflective modules (folded modules) 1200 and 1300) provided in an internal space of the housing 1100, a lens module 1500, and an image sensor unit 1900. For example, in the internal space of the housing 1100, a plurality of reflective modules 1200 and 1300 may be provided in front of the lens module 1500 to change a path of incident light, and an image sensor unit 1900 may be provided in the rear of the lens module 1500 such that an image is formed by the incident light. The image sensor unit 1900 may include an image sensor, converting light passing through a plurality of lenses into an electrical signal, and a printed circuit board (PCB) on which the image sensor is mounted. In addition, the housing 1100 may be provided with a baffle in front or the rear of the lens module 1500 to block unnecessary light, which may be introduced into the image sensor unit 1900, so as to reduce flare. As necessary, one or more baffles may be provided in the internal space of the housing 1100. The baffle may be, for example, a blocking member 1400 illustrated in FIG. 5.

In embodiments, the reflective modules 1200 and 1300 may be configured to change a propagation direction of light. For example, light may be incident from a subject through a cover (that is, a shield can) 1110, covering the camera module 1000 from above, in a thickness direction (for example, a Y-axis direction) of the camera module 1000. An optical path of the incident light may be changed by the plurality of reflective modules 1200 and 1300 provided in the housing 1100. Then, the incident light may reach the image sensor 1900 through the lens module 1500 in an optical axis (Z-axis) direction to be converted into an electrical signal. To change the optical path, the plurality of reflective modules 1200 and 1300 may be provided with a reflective member reflecting a light.

At least two reflective modules 1200 and 1300 may be provided. The number of changes in the optical path of the light incident into the housing 1100 may correspond to the number of reflective modules 1200 and 1300 provided in the housing 1100. For example, when two or more reflective modules 1200 and 1300 are provided, the optical path may be changed twice or more after being incident on the camera module 1000 until reaching the image sensor unit 1900.

FIG. 5 illustrates a camera module 1000 including a reflective module assembly provided with two reflective modules 1200 and 1300.

The first reflective module 1200 may be provided in a first space 1101 formed below an opening 1111 provided in an upper portion of a housing 1100. A second reflective module 1300 may be provided in a second space 1102 adjacent to one side of the first space 1101. A lens module 1500 may be provided in a third space 1103 adjacent to one side of the second space 1102, and an image sensor unit 1900 may be provided in the rear of the lens module 1500. Accordingly, light incident through the opening 1111 formed in a cover 1110 of the housing 1100 may reach the image sensor unit 1900 after sequentially passing through the first reflective module 1200, the second reflective module 1300, and the lens module 1500.

The first reflective module 1200 may include a first reflective member 1220, a first holder 1210 supporting the first reflective member 1220, a first driving part 1230 driving the first holder 1210, and a first ball member 1240 rotatably supporting the first holder 1210, and a first pulling magnet 1250 pulling the first holder 1210 to the housing 1100. The first driving part 1230 may include a first magnet 1231, provided in the first holder 1210, and a first coil 1232 and a first position sensing part 1233 provided in the housing 1100.

The second reflective module 1300 may include a second reflective member 1320, a second holder 1310 supporting the second reflective member 1320, a second driving part 1330 driving the second holder 1310, a second ball member 1340 rotatably supporting the second holder 1310, and a back yoke 1350 improving performance of the second driving part 1330. The second driving part 1330 may include a second magnet 1331, provided in the second holder 1310, and a second coil 1332 and a second position sensing part 1333 provided in the housing 1100. The second ball member 1340 may include a rotation axis ball 1341, forming a rotation axis of the second holder 1310, and a guide ball 1342 guiding a rotation of the second holder 1310. Since a rotation structure of the second reflective module 1300 is different from a rotation structure of the first reflective module 1200, the number of the second ball members 1340 may be different from the number of the first ball members 1240.

Each of the first ball member 1240 and the second ball member 1340 may be provided in a spherical shape, but a shape thereof is not limited to being spherical. Each of the first ball member 1240 and the second ball member 1340 may be provided in a round shape to perform a rolling motion within a predetermined range. In the following description, the first ball member 1240 and the second ball member 1340 may respectively correspond to a first sphere and a second sphere, and thus descriptions thereof will be omitted.

As illustrated in FIG. 5, the housing 1100 of the camera module 1000 may be integrally formed to have a first space 1101, a second space 1102, and a third space 1103. The first reflective module 1200, the second reflective module 1300, and the lens module 1500 may be mounted in the first space 1101, the second space 1102, and the third space 1103 of the housing 1100, respectively. The image sensor unit 1900 may be provided in the rear of the lens module 1500.

However, FIG. 5 is only an example, and the housing 1100 may be formed by coupling a first sub-housing having the first space 1101, a second sub-housing having the second space 1102, and a third sub-housing having the third space 1103. For example, the first sub-housing may define the first space 1101 and may include the first reflective module 1200 therein, the second sub-housing may define the second space 1102 and may include the second reflective member 1300 therein, and the third sub-housing may define the third space 1103 and may include the lens module 1500 therein.

The first sub-housing, the second sub-housing, and the third sub-housing may be provided to be separate from each other, and may be coupled to each other to form the housing 1100 of the camera module 1000. For example, the first sub-housing and the second sub-housing may be coupled to be in contact with each other, and thus may be provided over the first space 1101 and the second space 1102, and an optical path change portion including the first reflective module 1200 and the second reflective module 1300 may be formed. In addition, the third sub-housing may be coupled to be in contact with the second sub-housing, and thus, incident light emitted from the optical path change portion including the first reflective module 1200 and the second reflective module 1300 may be incident on the lens module 1500 in the optical axis (Z-axis) direction.

In addition, the first sub-housing and the second sub-housing may be integrally provided to form a housing of the reflective module assembly according to embodiments. Accordingly, the first reflective module 1200 and the second reflective module 1300 may be provided inside the housing of the reflective module assembly in which the first sub-housing and the second sub-housing are integrally formed. The third sub-housing, in which the lens module 1500 is provided, may be assembled with the housing of the reflective module assembly to form the housing 1100 according to embodiments as a whole. For example, incident light may change in a propagation path through the first reflective module 1200 and the second reflective module 1300, provided in the reflective module housing, and may be incident on the image sensor 1900 via the lens module 1500 of the third sub-housing.

In some embodiments, a direction from the first space 1101 to the second space 1102 and a direction from the second space 1102 to the third space 1103 may be perpendicular to each other. Accordingly, the housing 1100 may be formed to have an overall 'L' shape when viewed in a thickness direction (for example, a Y-axis direction). Due to the 'L' shape of which central portion is bent, the camera module according to embodiments may have an effect of reducing an overall length of the camera module 1000 while maintaining the optical path to be long for a zoom function and a tracking function.

In some embodiments, a blocking member 1400 for blocking unnecessary light may be provided between the first space 1101 and the second space 1102 in the housing 1100 to reduce flare. The blocking member 1400 may be a member disposed on the propagation path of the incident light and fitted into the internal space of the housing 1100, and may reduce unnecessary light to prevent excessive reflection from occurring when the incident light passes through the internal space of the housing 1100.

The blocking member 1400 may be provided as a plate-shaped member having a region opened to allow light, starting from the subject, to pass therethrough. A plurality of projections (not illustrated) may be provided on an end portion of the opened region of the blocking member 1400 to reduce flare caused by light reflection, diffraction, or the like.

A blocking member accommodating groove, in which the blocking member 1400 is accommodated, may be provided on the internal surface of the housing 1100 between the first space 1101 and the second space 1102. End portions of both sides of the blocking member 1400 may be slid in one direction (for example, a Y-axis direction) along the blocking member accommodation groove to be coupled to the inside of the housing 1100. As necessary, the blocking member 1400 may be removed from the housing 1100.

In some embodiments, one or more blocking members 1400 may be provided between the first space 1101 and the second space 1102, as necessary. The blocking member 1400 may be provided to reduce reflection or diffraction of unnecessary light which may occur while incident light is emitted from the first reflective module 1200 and is then incident on the second reflective module 1300.

Hereinafter, a change in a path of incident light by one or more reflective modules 1200 and 1300 provided in the camera module 1000 according to embodiments will be described in detail. Light may be incident into the housing 1100 from a subject in a first direction (for example, a Y-axis direction), a thickness direction of the camera module 1000. A propagation path of the incident light may be changed in the first reflective module 1200 provided to face the opening 1111. The first reflective module 1200 may include a first reflective member (1220 of FIG. 6A) to change the light propagation path. For example, the first reflective member (1220 of FIG. 6A) may be a first prism. Hereinafter, for ease of description, a component corresponding to the reflective member will be referred to as a prism. However, as mentioned above, a prism is an example of a reflective member, and any member (for example, a mirror, or the like) may be included in the reflective member described in some embodiments as long as it may diffract or reflect light to change a propagation path of the light. The light, incident in the thickness direction of the camera module 1000, may be reflected by the first prism of the first reflective module 1200 and may then be reflected in a second direction (for example, an X-axis direction) different from the first direction (for example, the Y-axis direction). Hereinafter, for ease of description, the light emitted from the first reflective module 1200 will be referred to as first reflected light. The first reflected light may be incident on the second reflective module 1300 provided in the housing 1100 in the second direction (for example, the X-axis direction). The second reflective module 1300 may include a second reflection member (1320 of FIG. 8A) to change the light propagation path. For example, the second reflective member 1320 of FIG. 8A may be a second prism. The first reflected light may be reflected from the second prism and may then be emitted in a third direction (for example, a Z-axis direction) different from the second direction (for example, X-axis direction), an incident direction. Hereinafter, the light emitted from the second reflective module 1300 will be referred to as second reflected light. The incident light may be changed in propagation path in the order of the first, second, and third directions while sequentially passing through the first reflection module 1200 and the second reflection module 1300, and may finally be incident on the lens module 1500 in the third direction.

Light, having a propagation path changed by the first reflective module 1200 and the second reflective module 1300, may be incident on the lens module 1500. Therefore, a plurality of lenses provided in the lens module 1500 may be stacked in the third direction (for example, the Z-axis direction), a direction in which the light is emitted from the second reflective module 1300. The lens module 1500 may be moved in the optical axis (Z-axis) direction to implement autofocusing (AF) function, a zoom functions, and the like.

The light emitted from the lens module 1500 may reach the image sensor unit 1900 disposed in the rear of the lens module 1500. The image sensor unit 1900 may convert the incident light into an electrical signal, and may transmit the electrical signal to an outside of the camera module 1000.

A main substrate 1800 may be provided on a side surface of the housing 1100. The main substrate 1800 may be electrically connected to the first reflective module 1200, the second reflective module 1300, the lens module 1500, and the image sensor unit 1900 to transmit and receive an electrical signal thereto and therefrom.

The internal space of the housing 1100 may be covered with the cover 1110. The cover 1110 may have an opening 1111 allowing light to be incident therethrough. The light, incident through the opening 1111, may be changed in propagation direction by the first reflective module 1200 and the second reflective module 1300 to be incident on the lens module 1500. The cover 1110 may be integrally provided to cover the entire housing 1100 or may be provided with divided members, respectively covering the reflective modules 1200 and 1300 and the lens module 1500.

When a still image or video is captured, the reflective members, respectively provided in the first reflective module 1200 and the second reflective module 1300, may be rotated and moved to track a moving subject. As the reflective members (1220 of FIG. 6A and 1320 of FIG. 8A) provided in the plurality of reflective modules 1200 and 1300 are rotated and moved, a path of light incident from the moving subject may be continuously changed, and thus, the incident light may accurately reach the lens module 1500. Accordingly, the path of the incident light may be changed several times to decrease a size of the camera module, which can be reduced while forming the path of the incident light to be long. Hereinafter, the first reflective module 1200 and the second reflective module 1300 provided in a reflective module assembly according to embodiments and a camera module including the same will be described in detail.

Figure 6A:
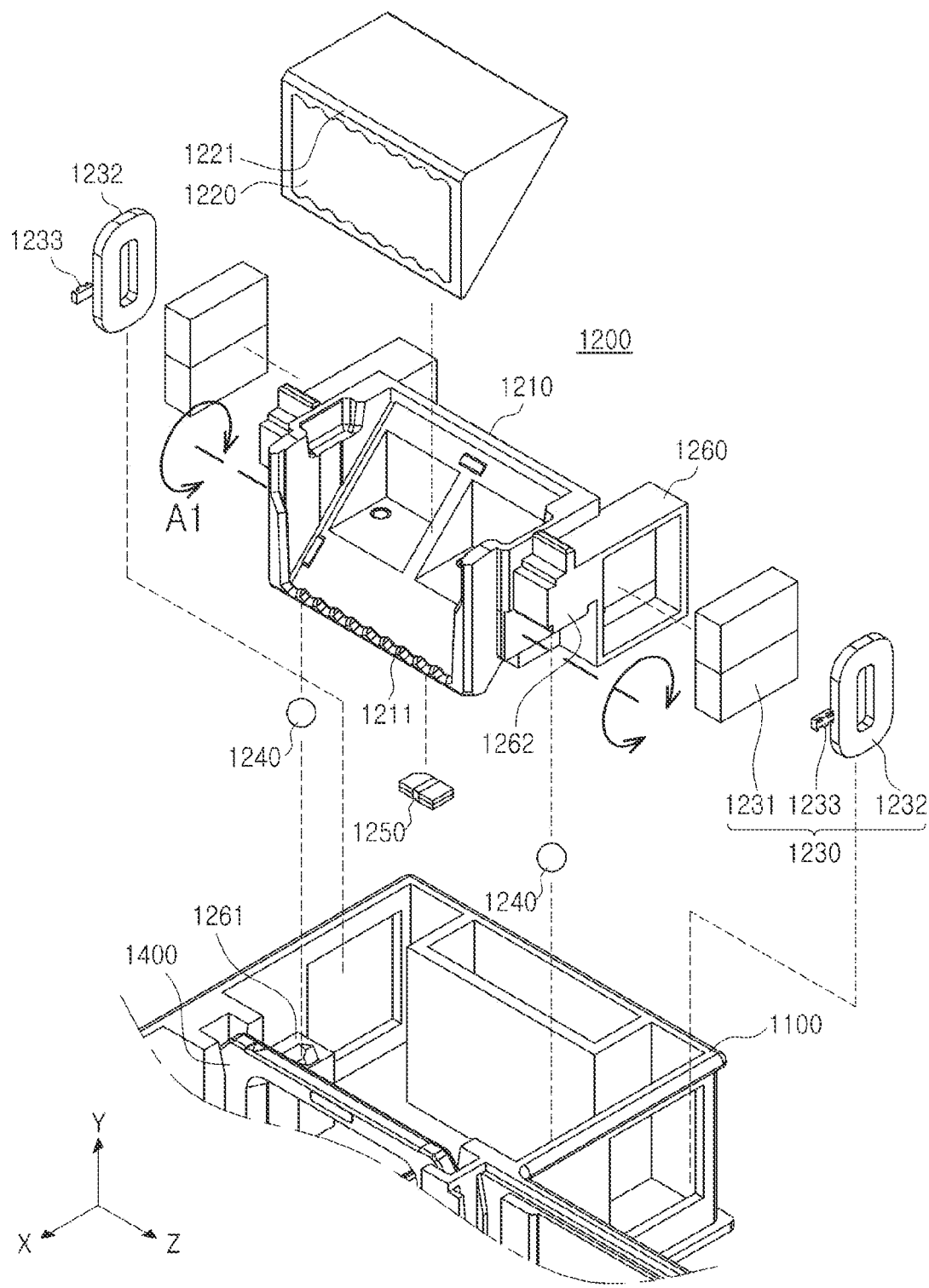
FIGS. 6A and 6B are exploded perspective views of a first reflective module according to one or more embodiments.
Figure 6B:
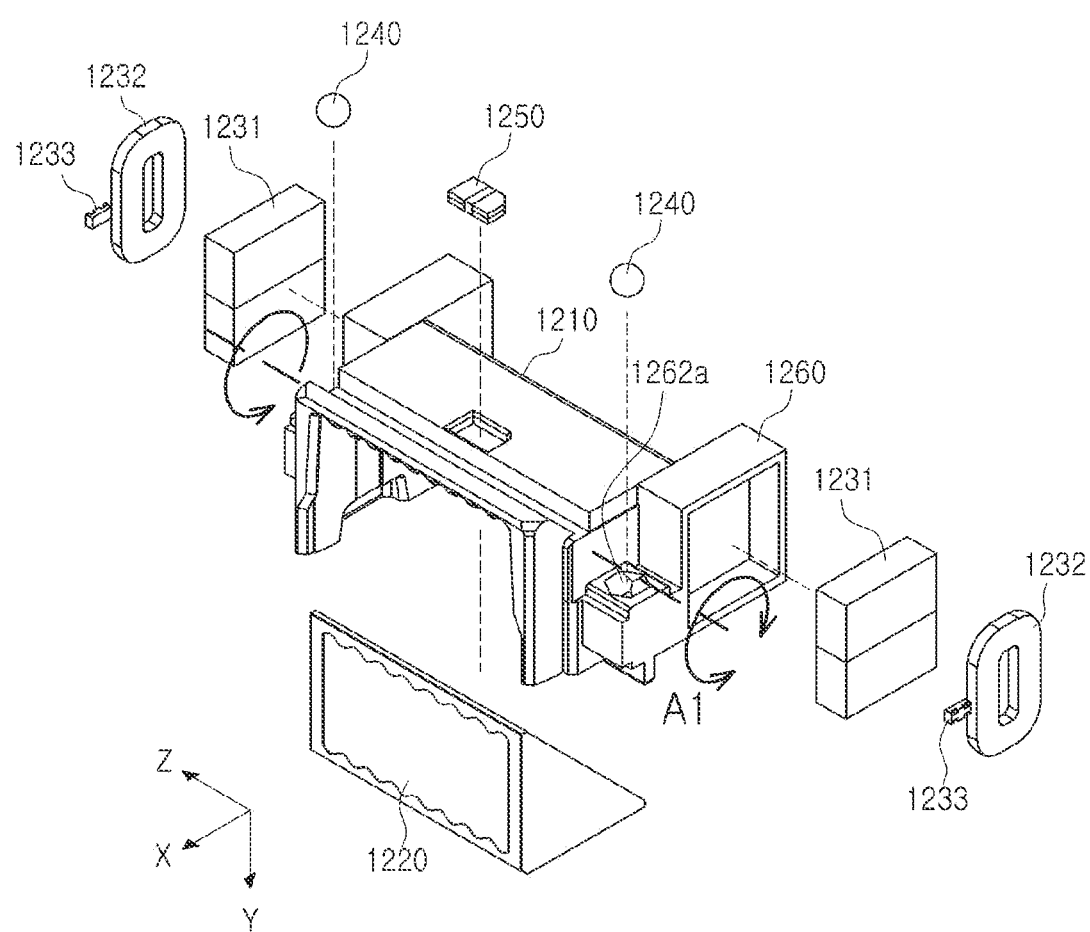
Figure 6C:
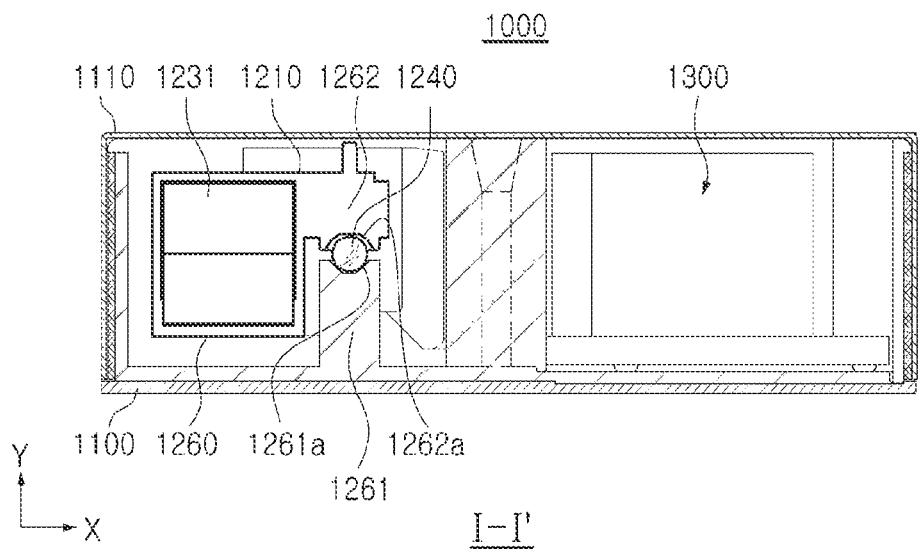
FIGS. 6C to 6E are cross-sectional views of the first reflective module according to one or more embodiments.
Figure 6D:
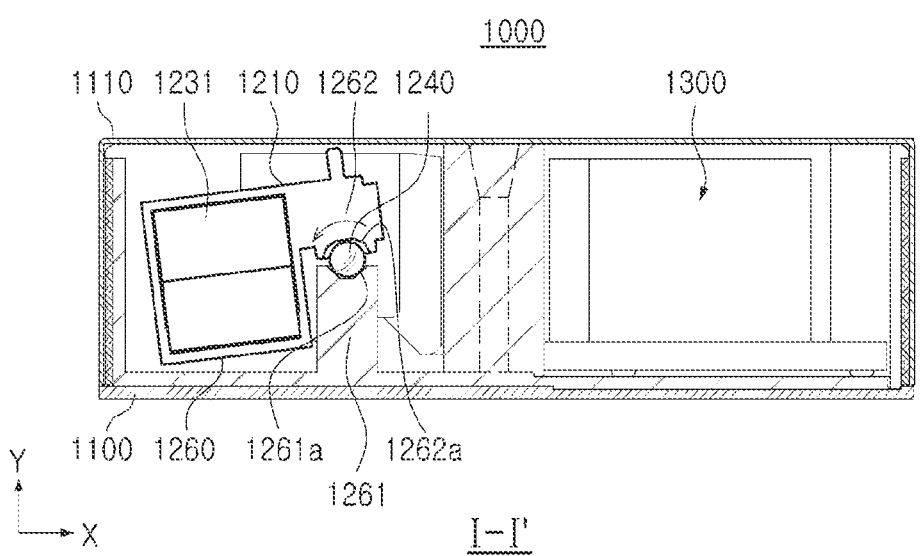
Figure 6E:
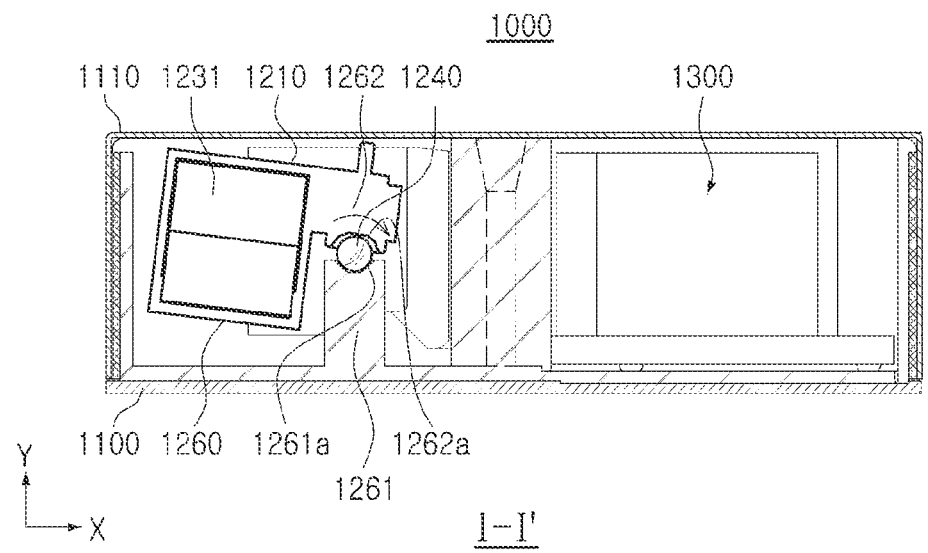
Figure 7A:
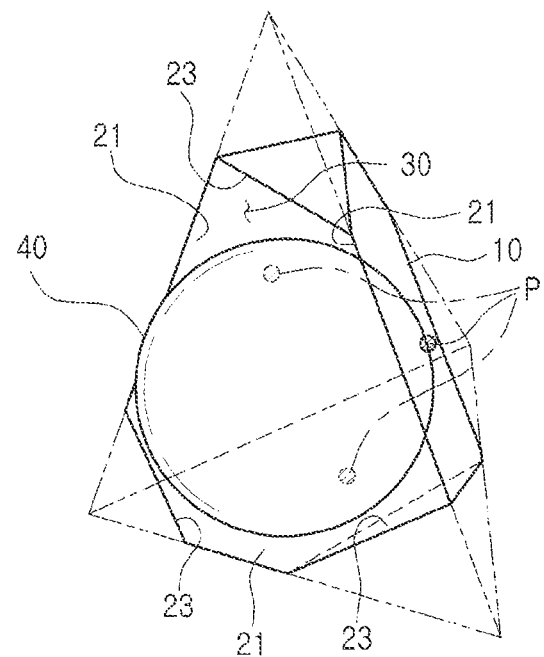
FIGS. 7A and 7B are reference views illustrating an example in which a ball member of a reflective module assembly according to one or more embodiments is fixed to support three points thereof on a guide portion.
Figure 7B:
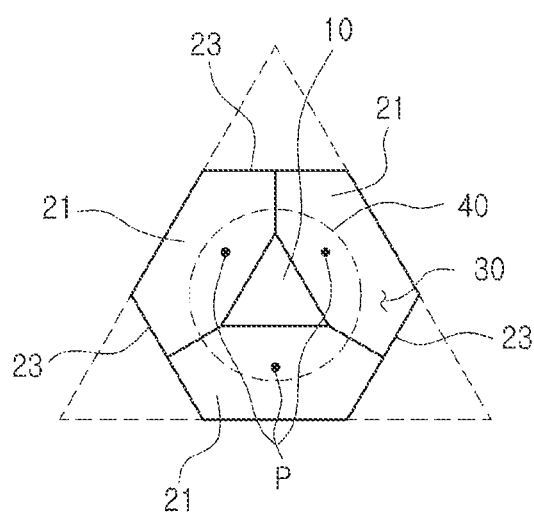

FIGS. 6A and 6B are exploded perspective views of a first reflective module 1200 according to one or more embodiments, FIGS. 6C to 6E are cross-sectional views illustrating rotation of the first reflective module 1200 at a predetermined angle while being inserted into a housing 1100. FIGS. 7A and 7B are reference views illustrating an example in which a ball member 40 of a camera module is fixed to support three points thereof on a guide portion 30.

As illustrated in FIG. 6A, the first reflective module 1200 may be provided to be inserted into the housing 1100, and may include a first holder 1210 fixedly provided with a first reflective member 1220, at least two first ball members 1240 inserted into the first holder 1210 and forming a first axis A1, a rotation axis of the first holder 1210, first driving parts 1230, respectively provided on both side surfaces of the first holder 1210 to rotate the first holder 1210 about the first axis A1, and a first pulling magnet 1250 pressing the first holder 1210 in a direction of the lower surface of the housing 1100. The first driving part 1230 may include a first magnet 1231 and a first coil 1232, magnetically interacting with each other, and a first position sensing part 1233 sensing the amount of rotation of the first holder 1210. In embodiments, the first axis A1 may be formed to be parallel to an optical axis of the lens module (for example, 1500 of FIG. 5).

Hereinafter, a detailed configuration of the first reflective module 1200 will be described. The first reflective module 1200 corresponds to the first reflective module 1200 described above with reference to FIG. 5, and thus duplicate descriptions thereof will be omitted.

The first reflective module 1200 may include a first reflective member 1220 which may change a path of incident light. In embodiments, the first reflective member 1220 may be fixed to the first holder 1210, and a propagation direction of the incident light may be changed from a first direction (for example, a Y-axis direction) to a second direction (for example, an X-axis direction). For example, the first reflective member 1220 may be a mirror or a prism reflecting light (for ease of description, the first reflective member 1220 is illustrated as having a prismatic shape in the drawings related to one embodiment). The first reflective member 1220 may include a chamfer 1221, in which a corner of the first reflective member 1220 is cut, to reduce flare. A light blocking film may be attached to the chamfer 1221, or a light blocking pigment may be coated on the chamfer 1221. Some surfaces of the first reflective member 1220 may be provided with a reflective surface to change a path of light. A propagation path of light, incident on the first reflective member 1220 from an external subject in the first direction (for example, the Y-axis direction), may be changed to the second direction (for example, the X-axis direction) after the incident light passes through the reflective surface of the first reflective member 1220. A blocking member 1400, which may block unnecessary light, may be provided on the propagation path of the light emitted by changing the propagation path of the first reflective member 1220 in the first reflective member 1220.

The first holder 1210 may be provided to be rotatable about the first axis A1, formed by the first ball member 1240, while fixing the first reflective member 1220. Rotational energy for rotating the first holder 1210 may be generated by the first driving part 1230 provided on the side surface of the first holder 1210.

The first holder 1210 may have a mounting surface on which the first reflective member 1220 is mounted. The mounting surface of the first holder 1210 may be provided as a surface inclined to change a path of light. For example, the mounting surface may be an inclined surface inclined at an angle of 30 degrees to 60 degrees with respect to an incident direction of incident light (for example, a Y-axis direction).

In some embodiments, the first holder 1210 may include a plurality of projections 1211 disposed in an end portion, from which incident light is reflected to be emitted, and protruding toward the first reflective member 1220 to reduce flare generated by light reflection, diffraction, or the like. An end portion of the projection 1211 may be formed to be sharp, and the projection 1211 may be provided over a predetermined region of an end portion of the mounting surface.

The first holder 1210 may be supported while being spaced apart from the lower surface of the housing 1100 in the state in which two first ball members 1240 are fitted between the first holder 1210 and the housing 1100. Since the first holder 1210 is spaced apart from the housing 1100 at a predetermined interval in the state in which the spherical first ball member 1240 is fitted between the first holder 1210 and the housing 1100, the first holder 1210 may rotate about a first axis A1 (for example, an axis parallel to a Z-axis, an optical axis) interconnecting the two first ball members 1240.

The first ball member 1240 may be fixed by a first support portion 1261, provided in the housing 1100, and a second support portion 1262, formed to face the first support portion 1261 in both side portions of the first holder 1210, to form the first axis A1. For example, the two first ball members 1240 of which positions are fixed with respect to the housing 1100 may be interconnected to form the first axis A1.

For example, as illustrated in FIG. 6C, the first ball member 1240 may be inserted to be fixed between the second support portion 1262 of the first holder 1210 and the first support portion 1261 of the housing 1100. More specifically, the first ball member 1240 may be inserted between the first guide portion 1261a of the first support portion 1261 and the second guide portion 1262a of the second support portion 1262 to fix a position of the first ball member 1240 with respect to the housing 1100.

Each of the first holder 1210 and the housing 1100 may be selectively provided with a pulling magnet or a pulling yoke to closely support the first holder 1210 to the housing 1100 while fitting the first ball member 1240 on the first holder 1210. For example, as illustrated in FIG. 6A, the first pulling magnet 1250 may be provided in a region of the first holder 1210, and a first pulling yoke (for example, 1270 of FIG. 10A) may be provided in a region, facing the first pulling magnet 1250, of an internal surface of the housing 1100. However, the illustrated content is only an example. In contrast, a first pulling magnet may be provided on the internal surface of the housing 1100, and a first pulling yoke may be provided on the first holder 1210. Alternatively, pulling magnets may be disposed on all facing surfaces of the first holder 1210 and the housing 1100. In embodiments, the first pulling magnet 1250 may be provided on a plane defined by the first axis A1. For example, the first pulling magnet 1250 may be provided on a plane, including the first axis A1 and extending in a direction perpendicular to a bottom surface of the housing 1100, such that at least a portion of the first pulling magnet 1250 overlaps the plane. That is, in FIG. 6A, the first pulling magnet 1250 and the first axis A1 may be aligned on one plane parallel to a Y-Z plane. Attractive force may act between the first pulling magnet 1250 and the first pulling yoke 1270, and a central point of the attractive force may be disposed on the Y-Z plane including the first axis A1. Accordingly, the attractive force generated by the first pulling magnet 1250 may be applied to the first holder 1210 in a direction, perpendicular to and intersecting the first axis A1. The attractive force of the first pulling magnet 1250 and the first pulling yoke (1270 of FIG. 10A) may allow the first holder 1210 to be closely supported by a lower surface of the housing 1100 while maintaining a predetermined distance between the first holder 1210 and the lower surface of the housing 1100.

The first holder 1210 may be rotated about the first axis A1 by electromagnetic force generated by the first driving part 1230. The first driving part 1230 may include first magnets 1231, respectively provided on both sides of the first holder 1210, a first coil 1232 provided on an internal sidewall of the housing 1100 facing the first magnet 1231, and a first position sensing part 1233 provided to be adjacent to the first coil 1232 and sensing the amount of rotation of the first holder 1210.

The first magnet 1231 may include an N-pole and an S-pole aligned in a direction, perpendicular to the first axis A1. For example, a surface of the first magnet 1231, facing the first coil 1232, may have an N-pole and an S-pole in the Y-axis direction. The N-pole and the S-pole of the first magnet 1231 may allow the first holder 1210 to be rotated by an electromagnetic interaction with the first coil 1232.

The first magnet 1231 may be disposed as far as possible from the first axis A1 to significantly increase rotational torque. To this end, in some embodiments, a first magnet accommodation portions 1260 protruding in a direction perpendicular to the first axis A1 (for example, the X-axis direction) may be provided on both sides of the first holder 1210. That is, since the first magnet accommodation portion 1260 is formed to protrude in a direction away from the first axis A1, a rotation axis, large rotational force may be generated while maintaining a size and a weight of the first holder 1210.

In embodiments, a first back yoke (not illustrated) may be provided between the first magnet 1231 and the first holder 1210 to maintain or improve performance of the first magnet 1231. The first back yoke (not illustrated) may have an area corresponding to or larger than an area of the first magnet 1231.

The first coil 1232 may be provided in a position facing the first magnet 1231 on the internal sidewall of the housing 1100. The first coil 1232 may receive an electrical signal, including current, from a main substrate (for example, 1800 of FIG. 5) provided on a sidewall of the housing 1100. When current is supplied to the first coil 1232, the current of the first coil 1232 and a magnetic field of the first magnet 1231 may electromagnetically interact with each other to generate a rotational torque rotating the first holder 1210 about the first axis A1. In embodiments, a first reflective module may be provided to be rotatable about the first axis A1 by about ±10 degrees (that is, a total of about 20 degrees).

In embodiments, as illustrated in FIG. 6A, the first position sensing part 1233 may be provided to be adjacent to the first coil 1232. Also, the first position sensing part 1233 may be disposed to face the first magnet 1231. In embodiments, the first position sensing part 1233 may be provided outside of the first coil 1232. Accordingly, the first position sensing part 1233 may accurately sense a position of the first holder 1210 without being affected by the magnetic field generated by the first coil 1232. However, the position of the first position sensing part 1233 is not limited to the outside of the first coil 1232. For example, the first position sensing part 1233 may be disposed inside the first coil 1232, or may be disposed outside the first coil in a direction away from the first axis A1.

In embodiments, as illustrated in FIG. 6A, at least one first position sensing part 1233 may be provided on each side of the first holder 1210 to accurately sense the amount of rotation of the first holder 1210. However, FIG. 6A is only an example, and a plurality of first position sensing parts 1233 may be provided on both sides of the first holder 1210 in a rotational direction of the first holder 1210.

In embodiments, the first reflective module 1200 may be controlled in a closed loop control manner in which the first position sensing part 1233 senses the degree of rotation of the first holder 1210 and feedbacks the sensed degree to the first driving part 1230. The first position sensing part 1233 may be a Hall sensor. Also, the first position sensing part 1233 may include an additional sensing magnet.

In embodiments, at least one first position sensing part 1233 may be provided on both side surfaces of the first holder 1210. For example, as illustrated in FIG. 6A, a single first position sensing part 1233 may be provided on both sides of the first holder 1210 outside the first coil 1232. In this case, two first position sensing parts 1233 may be provided to be spaced apart from the first axis A1 at the same distance. Since the first position sensing part 1233 is provided on both sides of the first holder 1210, the accurate amount of rotation may be measured even when the first holder 1210 is offset or tilted to one side.

FIGS. 6C to 6E are each cross-sectional views taken along line I-I' of FIG. 4. As illustrated in FIGS. 6C to 6E, the first holder 1210 may rotate about a first axis (for example, an axis orthogonal to an X axis and a Y axis of FIG. 6C) in a clockwise or counterclockwise direction. The first axis corresponds to the first axis A1 described with reference to FIGS. 6A and 6B, and thus duplicate descriptions thereof will be omitted.

The housing 1100 may include a first reflective module 1200 and a second reflective module 1300 therein. A first holder 1210 of the first reflective module 1200 may be supported by a first support portion 1261 with a first ball member 1240 interposed therebetween. A first magnet accommodation portion 1260 and a first magnet 1231 may be provided on a side surface of the first holder 1210. The first holder 1210 may be rotated about the first axis (for example, the axis orthogonal to the X axis and the Y axis of FIG. 6C), a rotation axis, in a clockwise or counterclockwise direction by the first driving part 1230. A first guide portion 1261a may be provided with a first support portion 1261 and a second support portion 1262 may be provided with a second guide portion 1262a to fix a position of the first ball member 1240 and to stably rotate the first ball member 1240.

FIG. 6C illustrates a state in which the first holder 1210 is horizontally supported with respect to the housing 1100 by the first support portion 1261 of the housing 1100. FIG. 6D illustrates a shape when the first holder 1210 maximally rotates about a first axis (an axis orthogonal to an X-axis and a Y-axis), a rotation axis formed by the first ball member 1240, in a counterclockwise direction. FIG. 6E illustrates a shape when the first holder 1210 maximally rotates about a first axis (an axis orthogonal to an X-axis and a Y-axis), a rotation axis formed by the first ball member 1240, in a clockwise direction.

As described above, the first support portion 1261 of the housing 1100 may be provided with a first guide portion (for example, 1261a of FIG. 6C) and the second support portion 1262 of the first holder 1210 may be provided with the second guide portion 1262a such that the first ball member 1240 is inserted therebetween. Since the spherical first ball member 1240 should not be moved, at least one of the first guide portion 1261a and the second guide portion 1262a may be inclined to support at least three points thereof on the first ball member 1240. Hereinafter, a support structure of the first ball member 1240 will be described in detail with reference to FIGS. 7A and 7B.

FIGS. 7A and 7B are reference views illustrating an example in which a ball member 40 of a reflective module assembly (for example, the first reflective module 1200 and the second reflective module 1300) according to embodiments is fixed to support three points thereof on a guide portion 30. The ball member 40 corresponds to the first ball member of FIGS. 6A to 6E and the guide portion 30 corresponds to the first guide portion 1261a or the second guide portion 1262*a* of FIGS. 6A to 6E, and thus duplicate descriptions thereof will be omitted.

Since a position of the ball member 40 forming a rotation axis cannot be moved, the position may be fixed by the three-point supporting structure. In embodiments, the ball member 40 may be inserted into the guide portion 30.

The ball member 40, inserted into the guide portion 30, may be maintained to be in contact with and supported by the guide portion 30 at three points P to maintain an accurate position inside the guide portion 30. When the ball member 40 is in contact with the guide portion 30 at four or more points, the ball guide 40 may be driven while being offset to one side, for example, a contact may be formed at only three points, depending on a manufacturing tolerance or a driving state of the guide portion 30 or the ball member 40. To address such an issue, the guide portion 30 may be provided to have a shape formed by cutting each corner of a triangular pyramid (tetrahedron). The guide portion 30 includes three first surfaces 21 such that the spherical ball member 40 may supported at three points P by an internal side surface of the guide portion 30. Therefore, three contact points P of the ball member 40 and the guide portion 30 may be formed on the first surface 21. The first surface 21 may be a portion of the side surface, and the side surface may be provided between a first surface 21 and a first surface 21 with which the ball member 40 is in contact (that is, provided to be adjacent to two of the first surfaces 21) and may include a second surface 23 which is not in contact with the ball member 40. When three side surfaces (three first surfaces 21) which are each in point contact with the ball member 40 extend, a triangular pyramid (a tetrahedron) may be implemented. For example, a line segment formed by extending the three side surfaces in point contact with the ball member 40 to intersect each other may implement a corner of a triangular pyramid (a tetrahedron). In addition, a triangular pyramid implemented by extending three side surfaces may be an equilateral triangular pyramid.

The guide portion 30 may be provided to have a shape formed by cutting each vertex of a triangular pyramid (tetrahedron). A portion of the triangular pyramid formed by cutting an internal corner of the guide portion 30 may form a bottom 10 of the guide portion 30, and portions formed by cutting the other three corners of an entrance of the guide portion may form the second surface 23 of the side surfaces not in contact with the ball member 40. As the bottom 10 and the second surface 23 are formed by cutting corners of the triangular pyramid, each of the bottom 10 and the second surface 23 may have a triangular shape and the ball member 40 may not be in contact with the bottom 10 and the second surface 23. The entrance of the guide portion 30 may have a hexagonal shape because the guide portion 30 is formed by cutting all corners of the triangular bottom of the triangular pyramid (tetrahedron). The bottom of the guide portion 30 may have a triangular shape.

Since the ball member 40 of the camera module is supported at three points by the guide portion 30 and is stably fixed to form a rotation axis, a position of the rotation axis is always fixed with respect to the housing 1100. Accordingly, the first reflective module 1200 may stably rotate about the first axis A1.

Figure 8A:
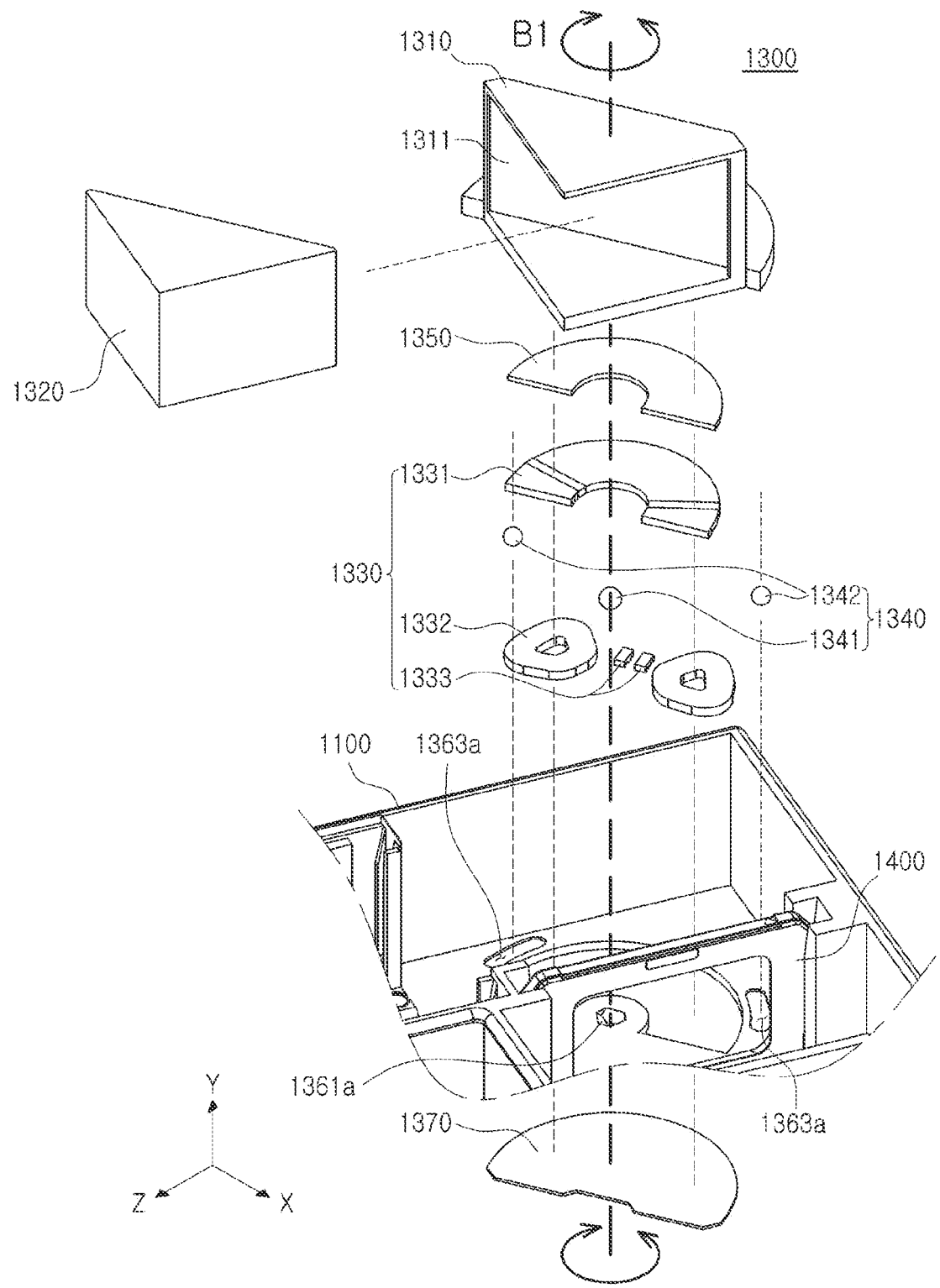
FIGS. 8A and 8B are exploded perspective views of a second reflective module according to one or more embodiments.
Figure 8B:
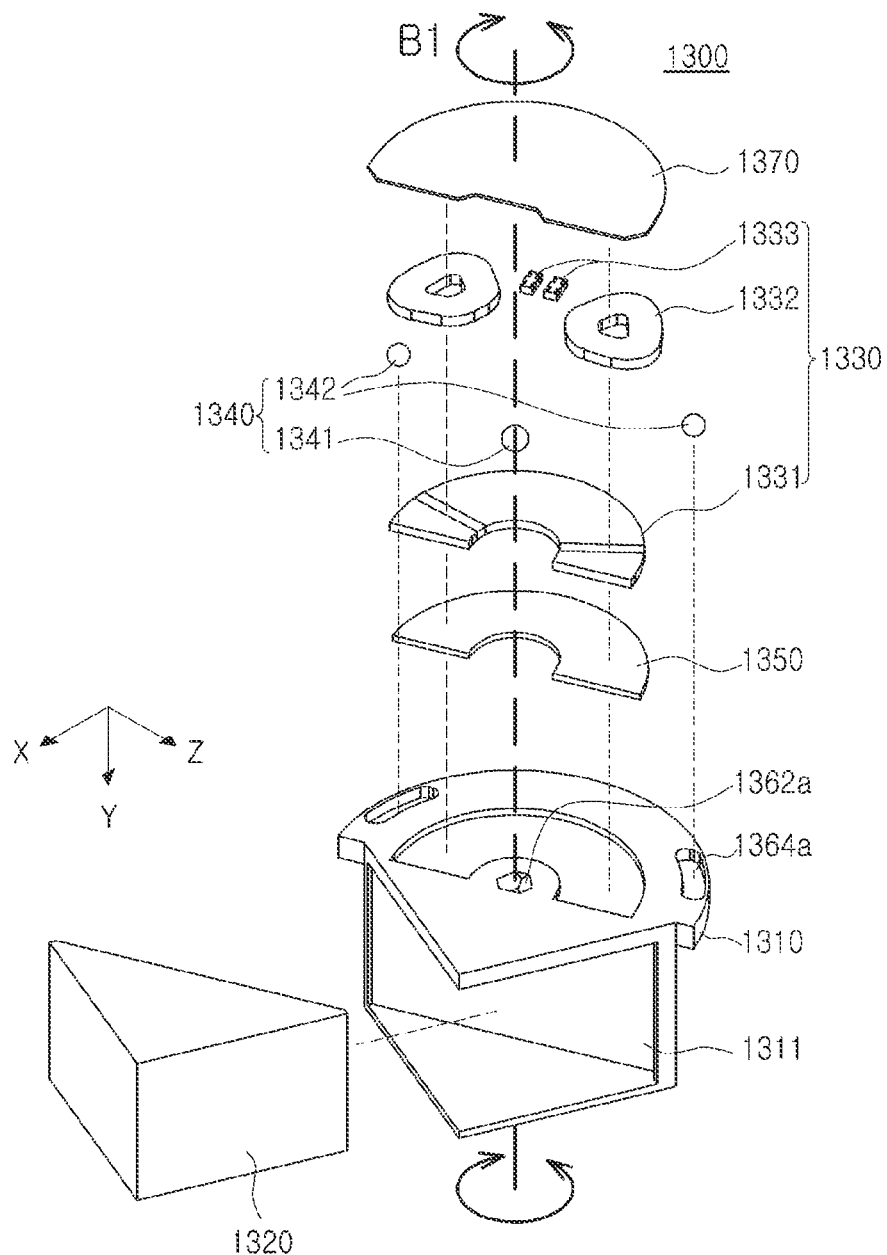

As illustrated in FIGS. 8A and 8B, the second reflective module 1300 may be provided to be inserted into the housing 1100, and may include a second holder 1310 fixedly provided with a second reflective member 1320, a rotation axis ball 1341 provided on a lower surface of the second holder 1310 to form a second axis B1, a rotation axis of the second holder 1310, a second driving part 1330 provided on the lower surface of the second holder 1310 to rotate the second holder 1310 about the second axis B1, and a second pulling yoke 1370 pressing the second holder 1310 in a direction of a lower surface of a housing (for example, 1100 of FIG. 5). For example, the second pulling yoke 1370 may be a pulling magnet magnetically interacting with the second magnet 1331. The second driving part 1330 may include a second magnet 1331 and a second coil 1332, electromagnetically interacting with each other, and a second position sensing part 1333 sensing the amount of rotation of the second holder 1310.

In embodiments, the second axis B1 may be perpendicular to a first axis (A1 of FIG. 6A), a rotation axis of the first reflective member (for example, 1220 of FIG. 6A). For example, the second axis B1 may be formed to be perpendicular to the first axis (A1 in FIG. 6A) and to intersect an optical axis of the lens module (for example, 1500 in FIG. 5).

Hereinafter, a configuration of the second reflective module 1300 will be described in detail with reference to FIGS. 8A and 8B.

The second reflective module 1300 may include a second reflective member 1320 which may change a path of the incident light. In embodiments, the second reflective member 1320 may be fixedly provided on the second holder 1310, and may change a propagation direction of the incident light from a second direction (for example, an X-axis direction) to a third direction (for example, a Z-axis direction). For example, the second reflective member 1320 may be a mirror or a prism reflecting light (for ease of description, the second reflective member 1320 is illustrated as having a prismatic shape in the drawings related to one embodiment). The second reflective member 1320 may include a chamfer (not illustrated), in which a corner of the second reflective member 1320 is cut, to reduce flare. A light blocking film may be attached to the chamfer (not illustrated), or a light blocking pigment may be coated on the chamfer (not illustrated). Some surfaces of the second reflective member 1320 may be provided with a reflective surface to change a path of light.

In embodiments, an incident surface of the second reflective member 1320 and an emission surface of the first reflective member (for example, 1220 of FIG. 6A) may be provided to face each other. For example, light emitted from the first reflective member (1220 of FIG. 6A) in the second direction (for example, the X-axis direction) may be incident on the incident surface of the second reflective member 1320 through a blocking member 1400 provided in the housing 1100. The light, incident on the second reflective member 1320, may be emitted through the reflective surface of the second reflective member 1320 after a propagation path of the second reflective member 1320 is changed to a third direction (for example, a Z-axis direction). The light, emitted in the third direction (for example, the Z-axis direction), may be incident on a lens module (for example, 1500 of FIG. 5) provided to be adjacent to the second reflective module 1300. The second direction (for example, the X-axis direction) and the third direction (for example, the Z-axis direction) correspond to the second and third directions described with reference to FIGS. 4 and 5, and duplicate descriptions thereof will be omitted.

The second holder 1310 may have a mounting surface 1311 on which the second reflective member 1320 is mounted. The mounting surface 1311 of the second holder 1310 may be provided as a surface inclined to change a path of light. For example, the mounting surface 1311 may be an inclined surface inclined by 30 degrees to 60 degrees with respect to an incident direction of the incident light (for example, the X-axis direction).

In embodiments, a plurality of projections (not illustrated), protruding toward the second reflective member 1320, may be provided on an end portion, on which incident light is reflected and incident, of the second holder 1310 to reduce flare caused by light reflection, diffraction, or the like. An end portion of the protrusion (not illustrated) may be formed to be sharp, and the protrusion (not illustrated) may be provided over a predetermined region of an end portion of the mounting surface.

The second holder 1310 may be provided to fix the second reflective member 1320 and to be rotatable about an axis fixed with respect to the housing 1100. In embodiments, the second holder 1310 may be supported while being spaced apart from a lower surface of the housing 1100 in the state in which a single rotation axis ball 1341 is fitted between the second holder 1310 and the housing 1100. Since the second holder 1310 is spaced apart from a bottom of the housing 1100 with the spherical rotation axis ball 1341 interposed therebetween, the second holder 1310 may rotate about a second axis B1 (for example, an axis parallel to a Y-axis intersecting an optical axis) formed to be perpendicular to a bottom surface of the housing 1100. In embodiments, at least a portion of the second holder 1310 may be provided in a round shape to facilitate rotation of the second holder 1310. More specifically, at least a portion of the second holder 1310 may be provided to correspond to a shape of an arc having the second axis B1 as a center. Hereinafter, the rotation of the second holder 1310 will be described in more detail.

The second holder 1310 may be supported while maintaining a predetermined distance from the bottom surface of the housing 1100 by at least three second ball members 1340 provided on the lower surface of the second holder 1310. For example, the second reflective module 1300 including three second ball members 1340 is illustrated in FIG. 8A. As illustrated in the drawing, since the second holder 1310 is supported at three points by the three second ball members 1340, the second holder 1310 may be supported without being inclined to one side. For example, the second holder 1310 may be supported while being maintained to be parallel to the bottom surface of the housing 1100.

The second ball member 1340 may include one rotation axis ball 1341 and two guide balls 1342. The rotation axis ball 1341 may form the second axis B1, a rotation axis of the second holder 1310, while being fitted between the lower surface of the second holder 1310 and the housing 1100. The guide ball 1342 may be provided on the lower surface of the second holder 1310 in a position, spaced apart from the second axis B1, to guide the rotation of the second holder 1310. The second axis B1 may be an axis, perpendicular to a plane including a triangle extending from the rotating axis ball 1341 to connect the three second ball members 1340.

In embodiments, the number of the second ball members 1340 including the rotation axis ball 1341 forming the second axis B1 may be different from the number of the first ball member (for example, 1240 of FIG. 6A) and each other. For example, the first reflective module (1200 of FIG. 5) and the second reflective module 1300 according to embodiments may form rotation axes in different directions through different numbers of ball members 1240 and 1340.

To insert the rotation axis ball 1341, the housing 1100 may be provided with a third guide portion (for example, 1361*a* of FIG. 8A) and the second holder 1310 may be provided with a fourth guide portion (for example, 1362*a* of FIG. 8B). Since a position of the spherical rotation axis ball 1341 should be fixed, at least one of the third guide portion (1361*a* of FIG. 8A) and the fourth guide portion (1362*a* of FIG. 8B) may be inclined to support the rotation axis ball 1341 at three points. For example, the third guide portion (1361*a* of FIG. 8A) or the fourth guide portion (1362*a* of FIG. 8B) may be provided to have a shape formed by cutting each corner from a triangular pyramid (tetrahedron), as illustrated in FIGS. 7A and 7B. A shape of a portion, in which the rotation axis ball 1341 is accommodated, in the third guide portion (1361*a* of FIG. 8A) and the fourth guide portion (1362*a* of FIG. 8B), may be the same as a shape of a portion, in which the first ball member (for example, 1262*a* of FIG. 6C) is accommodated, in the first guide portion (for example, 1261*a* of FIG. 6C) and the second guide portion (for example, 1262*a* of FIG. 6C), and thus a detailed description thereof may refer to the descriptions of FIGS. 6A to 6E and FIGS. 7A and 7B.

In embodiments, to insert the guide ball 1342, the housing 1100 may be provided with a fifth guide portion (for example, 1363*a* of FIG. 8A) and the second holder 1310 may be provided with a sixth guide portion (1364*a* of FIG. 8B). Since the spherical guide ball 1342 moves in, in detail, a rolling motion in a rotational direction of the second holder 1310, to move a position of the guide ball 1342, the fifth guide portion (1363*a* of FIG. 8A) and the sixth guide portion (1364*a* of FIG. 8B) may be provided to be long in the rotational direction of the second holder 1310. The fifth guide portion (1363*a* of FIG. 8A) or the sixth guide portion (1364*a* of FIG. 8B) may be provided to have various shapes. For example, at least one of the fifth guide portion (1363*a* of FIG. 8A) and the sixth guide portion (1364*a* of FIG. 8B) may be provided to have a shape of an arc corresponding to the rotation path of the second holder 1310. Alternatively, in embodiments, at least one of the fifth guide portion (1363*a* of FIG. 8A) and the sixth guide portion (1364*a* of FIG. 8B) may be provided to have a shape of a straight line in contact with the rotation path of the second holder 1310. When at least one of the fifth guide portion (1363*a* of FIG. 8A) and the sixth guide portion (1364*a* of FIG. 8B) is provided to have a shape of a straight line, a guide portion having a shape of a straight line may be provided such that the guide ball 1342 has an additional degree of freedom. This is because the guide ball 1342 supports the rotating second holder 1310, so that a guide operation may not be properly performed when a guide portion is provided to simply move in a direction of a straight line.

The guide ball 1342 according to embodiments may be supported by at least two points in one of the fifth guide portion (1363*a* of FIG. 8A) and the sixth guide portion (1364*a* of FIG. 8B) and may be supported by at least one point in the other thereof. Thus, the guide ball 1342 may move in a rolling motion.

Hereinafter, a structure in which at least one of the fifth guide portion (1363*a* of FIG. 8A) and the sixth guide portion (1364*a* of FIG. 8B) supports the guide ball 1342 will be described in detail.

Figure 9:
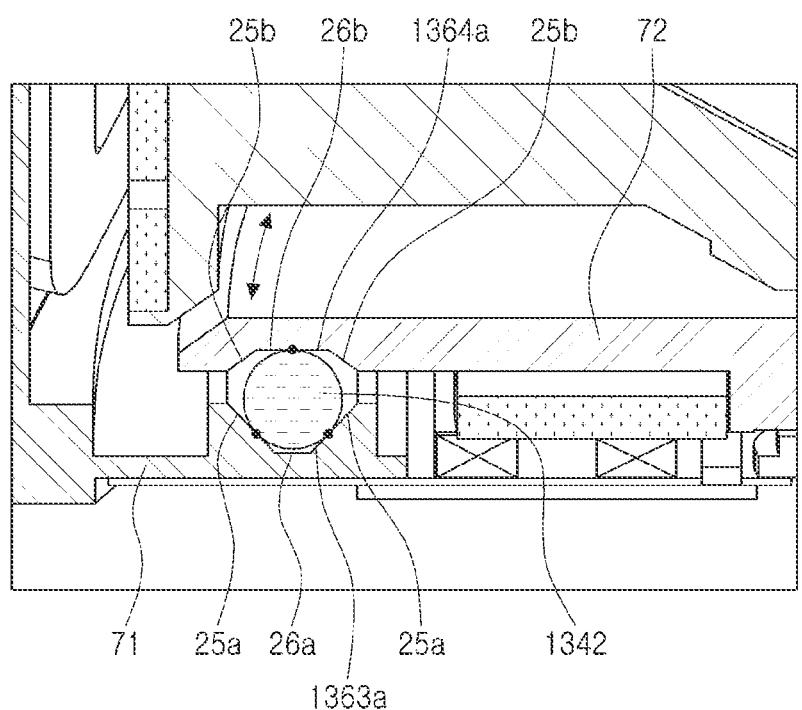
FIG. 9 is a schematic cross-sectional view illustrating a state in which a second reflective module is coupled to a housing of a reflective module assembly.

FIG. 9 is a schematic cross-sectional view illustrating a state in which a second reflective module 1300 is coupled to a housing 1100 according to embodiments.

Referring to FIG. 9, a rotation portion 72, rotating relative to a fixed portion 71 about a rotation axis, may be guided by a guide ball 1342. In this case, the fixed portion 71 may correspond to a certain region of the bottom surface of the internal space of the housing 1100 described with reference to FIGS. 4 to 8B, and the rotation portion 72 may correspond to a region of the lower surface of the second holder 1310 described with reference to FIGS. 4 to 8B, and thus duplicate descriptions thereof will be omitted.

Referring to FIG. 9, a fifth guide portion 1363*a* may have a V-shaped or U-shaped groove opened in an upward direction from a lower surface of the fixed portion 71. The guide ball 1342 may be inserted into the fifth guide portion 1363*a* and may be in contact with V-shaped or U-shaped both sides 25*a* to be supported at two or more points. Alternatively, the guide ball 1342 may also be in contact with a bottom surface 26*a* to be supported at three or more points.

A sixth guide portion 1364*a* may have a groove opened in a downward direction of the rotation portion 72 in a portion opposing the fifth guide portion 1363*a*. In the sixth guide portion 1364*a*, the guide ball 1342 may not be in contact with a side surface 25*b* of the sixth guide portion 1364*a* and may be supported by a bottom surface 26*b* of the sixth guide portion 1364*a* at one point. Accordingly, a ball may move right and left along the bottom surface 26*b* without restriction of a side surface 25*b* in a guide portion supported at only one point by the bottom surface 26*b* of the sixth guide portion 1364*a*, so that the sixth guide portion 1364*a* may have an additional degree of freedom to allow the guide ball 1342 to smoothly move in a rolling motion even when the rotation portion 72 is rotationally moved.

When the guide ball 1342 is in contact with either one of the side surfaces 25*b*, the guide ball 1342 cannot move in a rolling motion in a direction toward the rotation axis (or in a direction away from the rotation axis). Therefore, the side surfaces 25*b* may serve as a stopper.

As described above, the guide ball 1342 may be supported at two or more points in the fifth guide portion 1363*a*, provided in the fixed portion 71, to move in a rolling motion along a predetermined path of the guide portions 1363*a* and 1364*a*, and may be supported at one point by a bottom surface in the sixth guide portion 1364*a* provided in the rotation portion 72. The guide ball 1342, supported at one point, may move in a rolling motion with a predetermined degree of freedom on a guide portion bottom 26*b* of the rotation portion 72 as the rotation portion 72 moves, and thus may form a moving path. Accordingly, the guide ball 1342 may properly guide the rotation path while maintaining a small friction force, during the rotational movement of the rotating portion.

However, the description of the above-described fifth guide portion 1363*a* and the sixth guide portion 1364*a* is an example. On the contrary, the sixth guide portion 1364*a* may have a V-shaped or U-shaped groove opened in a downward direction of the second holder 1310. In this case, the guide ball 1342 may be provided to be supported at two or more points by the sixth guide portion 1364*a*, and the fifth guide portion 1363*a* may be provided such that the guide ball 1342 is supported at one or more points.

Returning to FIG. 8A, the second holder 1310 may be rotated about the second axis B1 by electromagnetic force generated from the second magnet 1331 and the second coil 1332 of the second driving part 1330. In embodiments, the second driving part 1330 may include a second magnet 1331 provided on a lower surface of the second holder 1310, at least one second coil 1332 provided on a lower surface of the housing 1100 facing the second magnet 1331, and a second position sensing part 1333 provided to be adjacent to the second coil 1332 and sensing the amount of rotation of the second holder 1310. The second position sensing part 1333 may be provided as at least one second position sensing part 1333. For example, the second position sensing part 1333 may be provided as at least two second position sensing parts 1333 to accurately sense the amount of rotation of the second holder 1310. Accordingly, the amount of rotation of the second holder 1310 may be stably sensed even when an impact is applied from an outside of the second reflective module 1300. In embodiments, the second position sensing part 1333 may be provided inside the second coil 1332. For example, one or more second position sensing parts 1333 may be provided inside the one or more second coils 1332. However, a position of the second position sensing part 1333 is not limited thereto, and the second position sensing part 1333 may be provided outside the second coil 1332 in a rotational direction of the second holder 1310.

To maintain or improve performance of the second driving part 1330, the second reflective module 1300 may be further provided with a back yoke 1350 provided between the second holder 1310 and the second magnet 1331 to focus a magnetic field of the second magnet 1331. Considering that the second magnet 1331 has a round shape, the back yoke 1350 may have a shape corresponding to the second magnet 1331 or may be provided to be larger than the second magnet 1331.

In embodiments, an N-pole and an S-pole may be alternately magnetized on the second magnet 1331 in the rotational direction of the second holder 1310. For example, the second magnet 1331 may be magnetized to three poles of 'N-pole, S-pole, N-pole' or 'S-pole, N-pole, and S-pole' in the rotational direction of the second holder 1310.

The second coil 1332 may receive an electrical signal, including current, from a main substrate (for example, 1800 of FIG. 5) provided on a sidewall of the housing 1100. When the current is supplied to the second coil 1332, the current of the second coil 1332 and the magnetic field of the second magnet 1331 may electromagnetically interact with each other, so that a rotational torque may be generated to rotate the second holder 1310 about the second axis B1 in a clockwise or counterclockwise direction. In embodiments, the second reflective module 1300 may be provided to be rotatable about the second axis B1 (for example, the Y-axis) by more than about ±11 degrees (that is, a total of about 22 degrees).

Figure 8C:
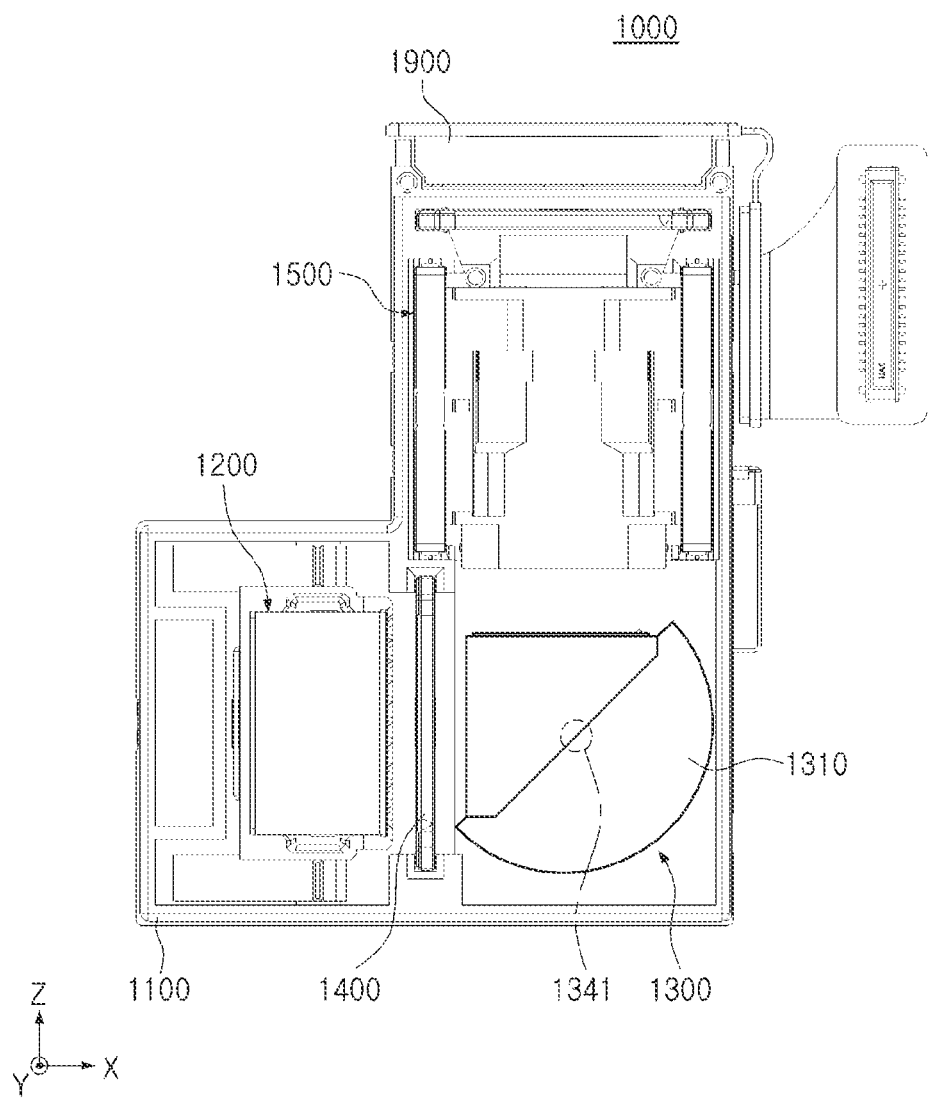
FIGS. 8C to 8E are schematic plan views illustrating a state in which a second reflective module is coupled to a housing of a camera module including a reflective module assembly, according to one or more embodiments.
Figure 8D:
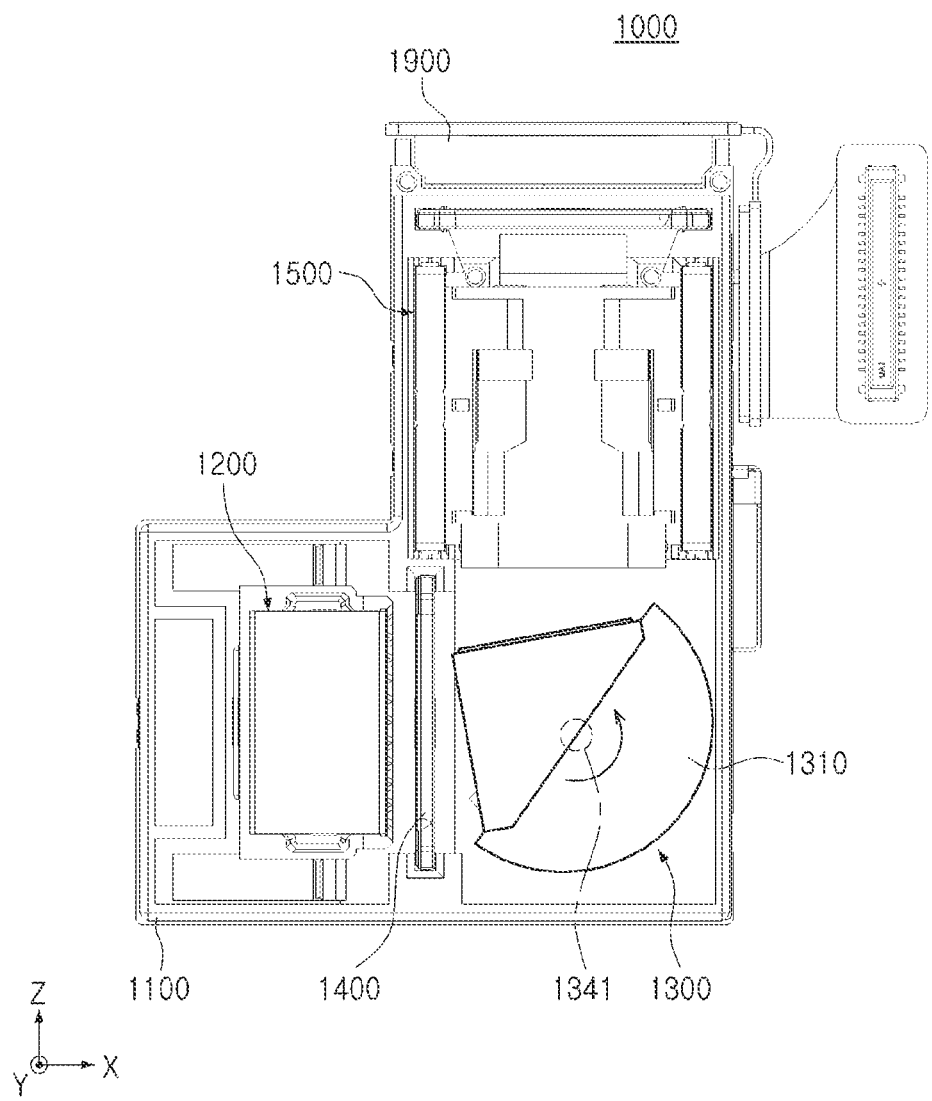
Figure 8E:
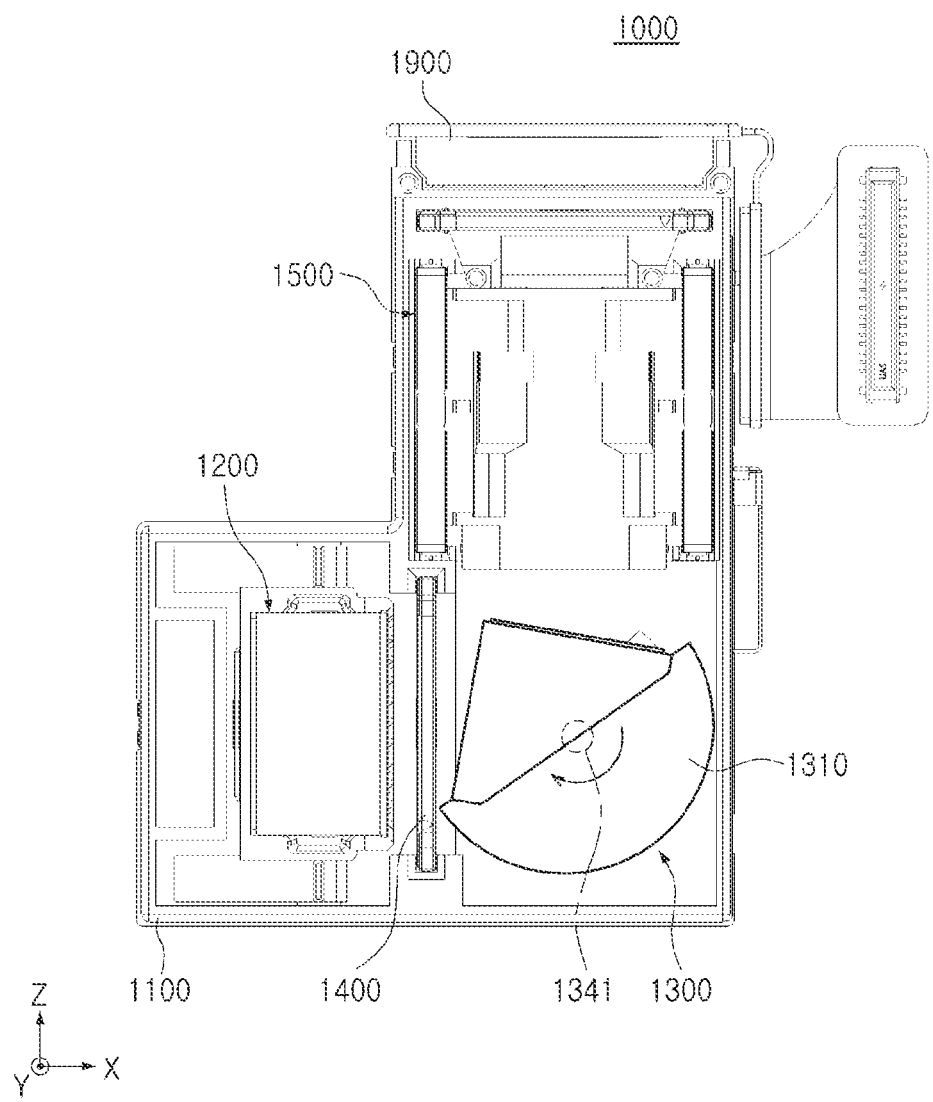

FIGS. 8C to 8E are diagrams illustrating a rotation of the second reflective module 1300. As illustrated in FIGS. 8C to 8E, the second holder 1310 of the second reflective module 1300 may rotate about a predetermined rotation axis (for example, the second axis of FIG. 8A) formed by the rotation axis ball 1341 within a predetermined angle range. FIG. 8C is a diagram illustrating the case in which the second holder 1310 of the second reflective module 1300 is in a neutral position, FIG. 8D is a diagram illustrating that the second holder 1310 of the second reflective module 1300 rotates about a predetermined rotation axis (for example, the second axis of FIG. 8A) in a counterclockwise rotation, and FIG. 8E is a diagram illustrating that the second holder 1310 of the second reflective module 1300 rotates about a predetermined rotation axis (for example, the second axis of FIG. 8A) in a clockwise direction.

As illustrated of FIG. 8C, in a camera module 1000 including the reflective module assembly according to embodiments, a first reflective module 1200 and a second reflective module 1300 may be disposed on a plane (for example, an X-Z plane) to change a path of incident light twice or more. After the incident light is incident on the first reflective module 1200, a path of the incident light may be changed through a first reflective member (1220 of FIG. 5) provided in the first reflective module 1200. The incident light may pass through a blocking member 1400, and may then be incident on the second reflective module 1300. The incident light, of which propagation path is changed once more in the second reflective module 1300, may be incident on an image sensor unit 1900 after passing through a lens module 1500 adjacent to the second reflective module.

As illustrated in FIGS. 8D and 8E, a second reflective module 1300 may rotate about a predetermined rotation axis (for example, the second axis of FIG. 8A) formed by a rotation axis ball 1341 to correspond to an incident angle, an incident position, and the like, of incident light. For example, when an incident angle and an incident position of light incident from the first reflective module 1200 are changed, the second reflective module 1300 according to embodiments may rotate at a predetermined angle corresponding thereto to change a propagation direction of the light to a direction corresponding to an optical axis direction of the lens module 1500. Accordingly, light incident on a camera module from an external entity may reach the image sensor unit 1900 by changing the propagation path in the plurality of reflective modules 1200 and 1300.

Returning to FIG. 8A, in embodiments, a center of gravity or a geometric center of the second magnet 1331 may be provided in a triangle formed by the second ball members 1340. The second holder 1310 is in close contact with the housing 1100 with the second ball member 1340 interposed therebetween by attractive force between the second pulling yoke 1370 and the second magnet 1331, which is aimed at preventing the second holder 1320 from being inclined to one side.

In embodiments, a second axis B1, a rotation axis of the second reflective module 1300, may be orthogonal to a first axis (for example, A1 of FIG. 6), a rotation axis of a first reflective module (1200 of FIG. 5). For example, the first axis (A1 of FIG. 6) may be parallel to a Z-axis, and the second axis B1 may be parallel to a Y-axis. Accordingly, the camera module 1000 may track a movement of a subject of interest by respectively rotating the first reflective module (1200 of FIG. 5) and the second reflective module 1300.

Figure 10A:
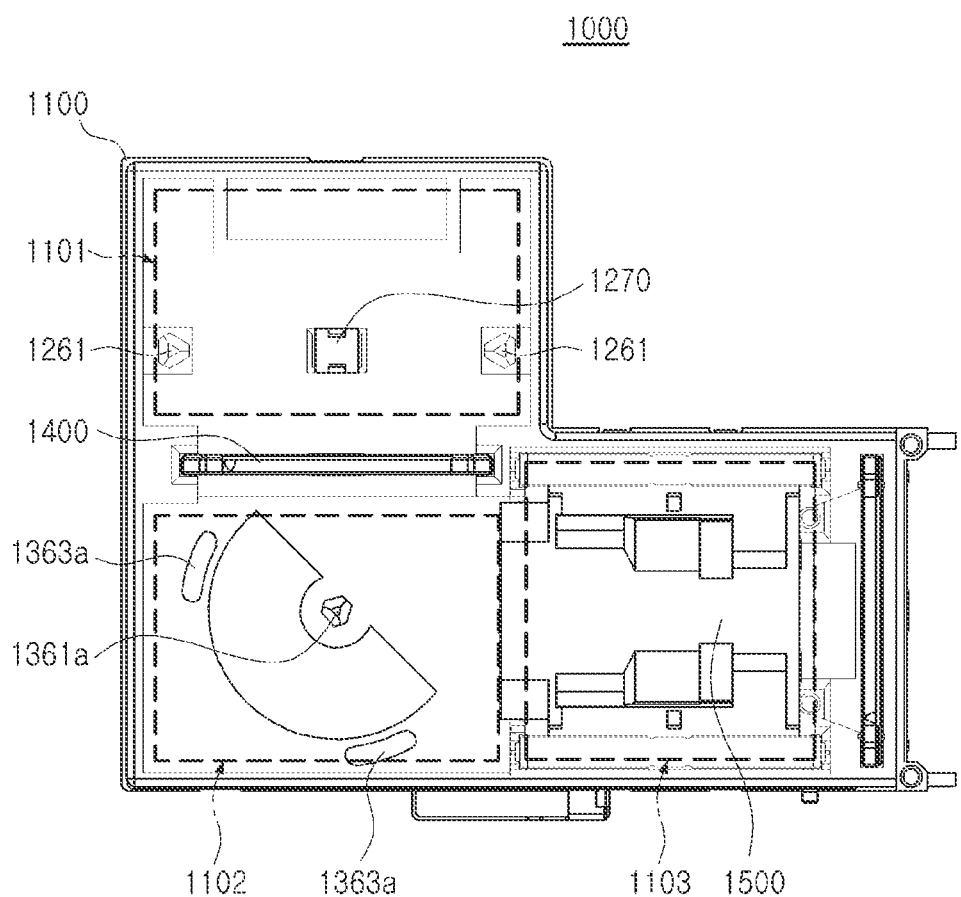
FIG. 10A is a top view illustrating the inside of a housing in a state in which some components of a first reflective module and a second module are omitted in a camera module according to one or more embodiments.
Figure 10B:
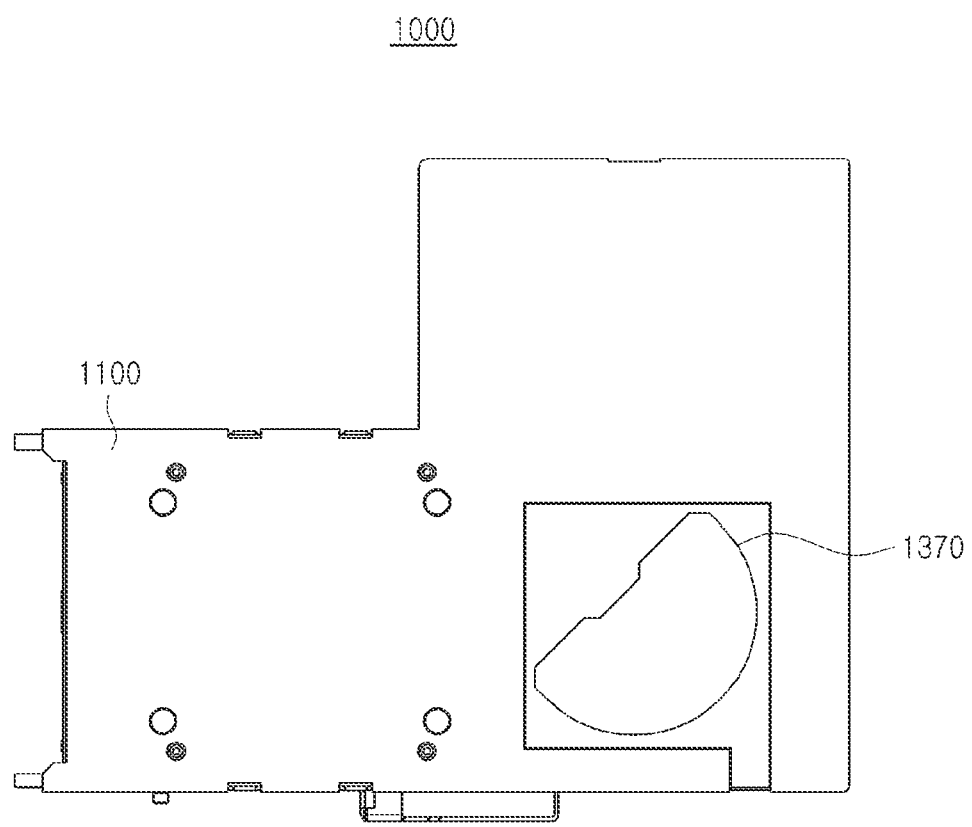
FIG. 10B is a bottom view of a housing of a camera module according to one or more embodiments.

An internal arrangement of the housing 1100 of the camera module 1000 according to embodiments will be described again with reference to FIGS. 10A and 10B. FIG. 10A is a top view illustrating the inside of a housing in a state in which some components of a first reflective module (1200 of FIG. 5) and a second module (1300 of FIG. 5) are omitted in a camera module 1000 according to some embodiments, and FIG. 10B is a bottom view of the housing 1100 of the camera module 1000 according to embodiments.

As illustrated in FIG. 10A, in embodiments, an inside of the housing 1100 of the camera module 1000 may be overall divided into a first space 1101, a second space 1102, and a third space 1103. A first reflective module (1200 of FIG. 5) may be mounted in the first space 1101, a second reflective module (1300 of FIG. 5) may be mounted in the second space 1102, and a lens module 1500 may be mounted in the third space 1103. Light, emitted from an external subject, may be incident on the first reflective module (1200 of FIG. 5) provided in the first space 1101, and may then be incident on an image sensor unit (1900 of FIG. 5) through the second reflective module (1300 of FIG. 5) in the second space 1102 and the lens module 1500 in the third space 1103. The first reflective module (1200 of FIG. 5), the second reflective module (1300 of FIG. 5), the lens module 1500, and the image sensor unit (1900 of FIG. 5) may respectively correspond to the first reflective modules 1200, the second reflective module 1300, the lens module 1500, and the image sensor unit 1900 described with reference to FIGS. 4 to 9, and thus duplicate descriptions thereof will be omitted.

A first pulling yoke 1270 and a first support portion 1261 may be provided on an internal surface of the housing 1100, corresponding to the first space 1101, to stably provide the first reflective module (1200 of FIG. 5). The first pulling yoke 1270 may be provided in a position facing a first pulling magnet of the first reflective module (1200 of FIG. 5), and the first support portion 1261 may be provided in a position facing a second support portion (1262 of FIG. 6A) of the first reflective module 1200. The first pulling yoke 1270 and the first support portion 1261 may respectively correspond to the first pulling yoke 1270 and the first support portion 1261 of FIGS. 6A to 6E, and thus duplicate descriptions thereof will be omitted.

A blocking member 1400, blocking unnecessary light to reduce flare, may be provided on the internal surface of the housing 1100 between the first space 1101 and the second space 1102. For example, incident light may pass through the blocking member 1400, and may be more stably incident on the second reflective module (1300 of FIG. 5) provided in the second space 1102.

A third guide portion 1361a and a fifth guide portion 1363a, stably providing the second reflective module (1300 of FIG. 5), may be provided on the internal surface of the housing 1100 corresponding to the second space 1102. The third guide portion 1361a and the fifth guide portion 1363a may respectively correspond to the third guide portion 1361a and the fifth guide portion 1363a of FIGS. 8 and 9, and thus duplicate descriptions thereof will be omitted.

The third space 1103 may be provided to be adjacent to the second space 1102, and the lens module 1500 may be provided inside the housing 1100 corresponding to the third space 1103. The lens module 1500 may correspond to the lens module 1500 of FIG. 5, and thus a duplicate description thereof will be omitted.

Referring to FIG. 10B, a second pulling yoke 1370, opposing the second magnet (1331 of FIG. 8A) of the second reflective module (1300 of FIG. 5), may be provided on a lower surface of the housing 1100 according to embodiments. The second reflective module 1300 may be in close contact with the housing 1100 by attractive force between the second pulling yoke 1370 and a second magnet 1331.

In the camera module 1000 according to embodiments, the inside of the housing 1100 may be divided into a plurality of spaces including a first space 1101, a second space 1102, and a third space 1103, and a single reflective module (1200 or 1300 of FIG. 5) may be provided in each of the spaces. That is, in the camera module 1000 according to embodiments, a plurality of reflective modules may be intensively in a narrow region. As a result, a significantly miniaturized camera module 1000 which may track a moving subject may be designed.

Figure 11:
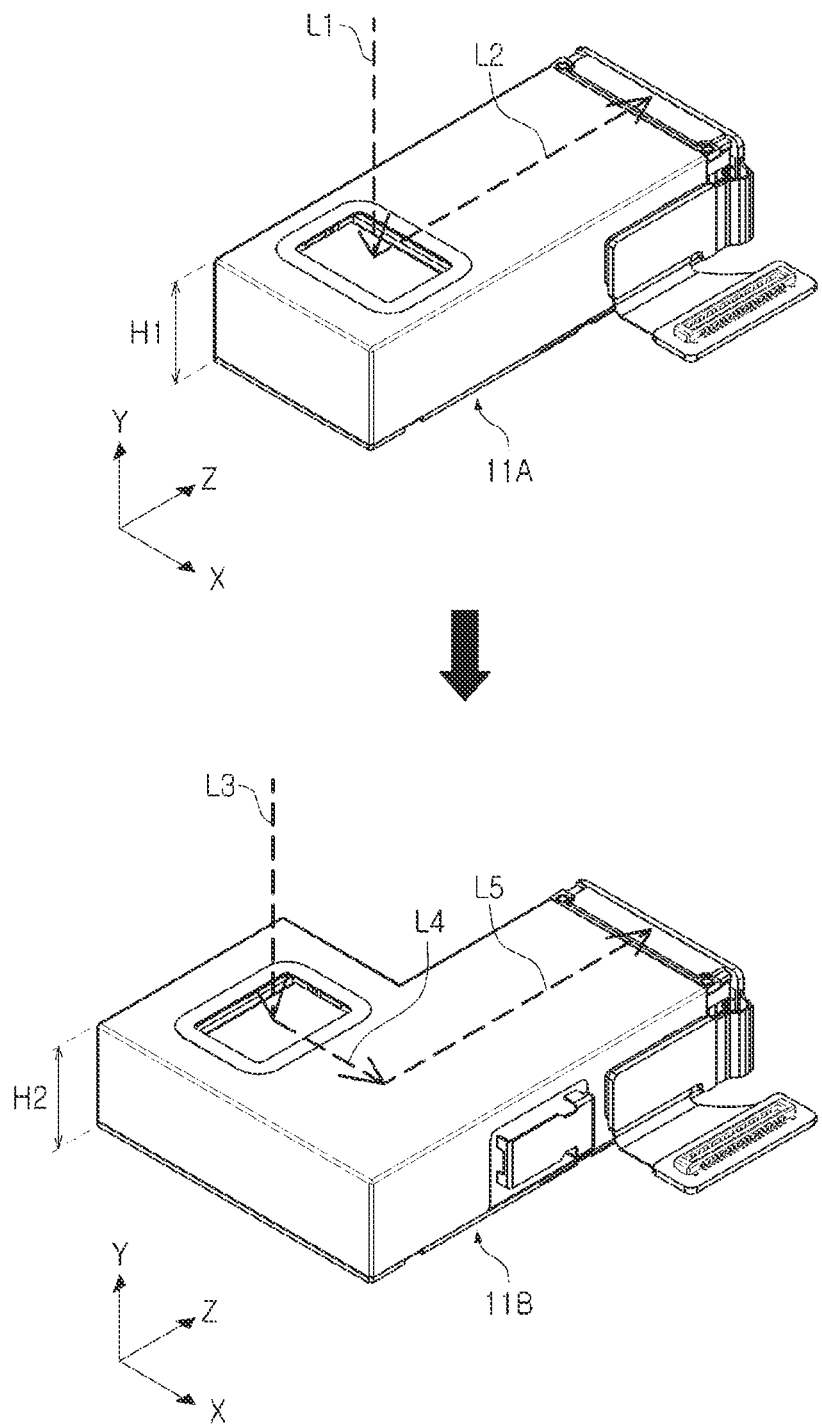
FIG. 11 is a reference view illustrating an overall height of a camera module according to one or more embodiments.

FIG. 11 is a reference view illustrating an overall height of various camera modules 11A and 11B according to one or more embodiments. In the following description, a height of the camera module 11A illustrated in an upper portion of FIG. 11 will be defined as H1, and a height of the camera module 11B illustrated in a lower portion of FIG. 11 will be defined as H2.

The camera module 11A illustrated in the upper portion of FIG. 11 may correspond to a camera module 11A provided with a single reflective module. After a path of incident light is changed once (for example, changed from L1 to L2), the incident light may be incident on an image sensor unit. A structure, which may rotate a reflective module in, in detail, a biaxial direction, is required to track a moving subject using a single reflective module or to effectively compensate for user hand-shake. In this case, biaxial rotation driving systems simultaneously coupled to the single reflective module should be provided to implement a rotation of the reflective module in a biaxial direction, resulting in an increase in structural complexity and an increase in overall height of the camera module.

The camera module 11B according to embodiments may be further provided with a component, which may change a path of incident light once more (that is, change the path from L4 to L5 after changing the path from L3 to L4), to have the same or further improved subject tracking effect while decreasing a height of the camera module 11B (the camera module 11B and L3, L4, and L5 may respectively correspond to the camera module 1000, the first direction, the second direction, and the third direction described with reference to FIG. 5, and thus duplicate descriptions thereof refer to FIG. 5). For example, the camera module 11B according to embodiments, includes a first driving part (for example, 1230 of FIG. 6A), rotating about a first axis, and a second driving part (for example, 1330 of FIG. 8A), rotating about a second axis, by dividing the rotation driving system. Thus, the path of the incident light may be various changed and a height (or a thickness) of the camera module 11B may be decreased.

Figure 12:
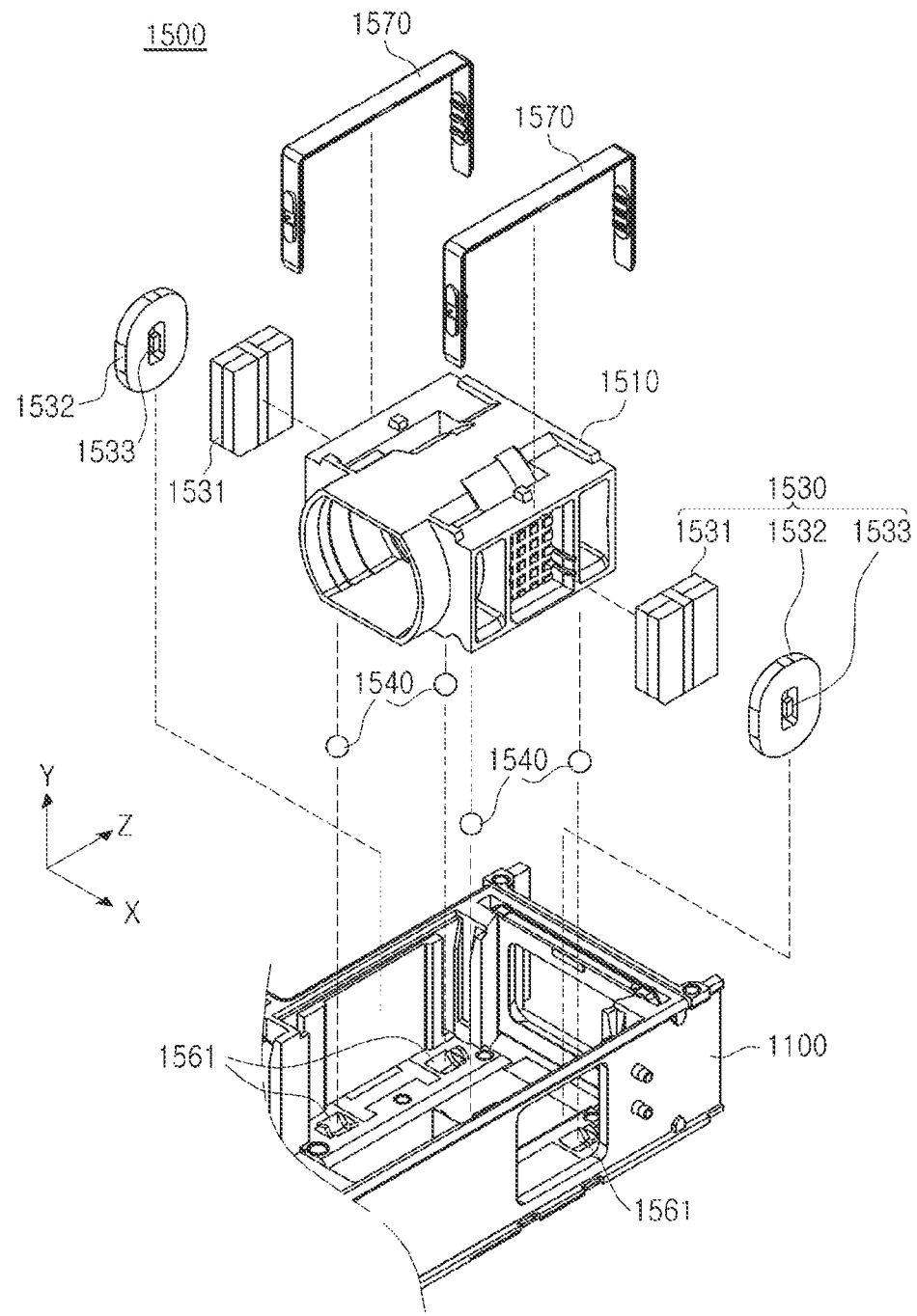
FIG. 12 is an exploded perspective view of a lens module according to one or more embodiments.

FIG. 12 is an exploded perspective view of a lens module 1500 on which light, emitted from a second reflective module (1300 of FIG. 5), is incident.

The lens module 1500 may include a plurality of lenses for imaging a subject, and the plurality of lenses may be accommodated in a lens holder 1510 along an optical axis. The lens holder 1510 may be moved in an optical axis (Z-axis) direction to implement an autofocusing function or a zoom function. A third driving part 1530 may generate driving force to move the lens holder 1510 in the optical axis (Z-axis) direction. That is, the third driving part 1530 may move the lens holder 1510 to change a distance between the lens holder 1510 and a second reflective module (1300 of FIG. 5) or a distance between the lens holder 1510 and an image sensor unit 1900. As an example, the third driving part 1530 may include at least one third magnet 1531, at least one third coil 1532 disposed to face the at least one third magnet 1531, and at least one third position sensing part 1533 provided to be adjacent to the third coil 1532.

The third driving part 1530 may generate driving force through an electromagnetic interaction between the third coil 1532 and the third magnet 1531. For example, when power is applied to the at least one third coil 1532, the lens holder 1510, on which the at least one third magnet 1531 is mounted, may be moved in the optical axis (Z-axis) direction by an electromagnetic interaction between the at least one third magnet 1531 and the at least one third coil 1532.

The third magnet 1531 may be mounted on the lens holder 1510. As an example, the third magnet 1531 may be mounted on a side surface of the lens holder 1510. The third coil 1532 is mounted on the housing 1100. As an example, a plurality of third coils 1532 may be mounted on the housing 1100 while being mounted on a main substrate (for example, 1800 of FIG. 5).

When the lens holder 1510 is moved, a position of the lens holder 1510 may be sensed and feedbacked in a closed loop control manner. Therefore, the third position sensing part 1533 may be used for closed-loop control. For example, the third position sensing part 1533 may be a Hall sensor. The third position sensing part 1533 is disposed inside or outside at least one of the third coils 1532, and the third position sensing part 1533 may be mounted on the main substrate on which the third coil 1532 is mounted.

The lens holder 1510 may be provided in the housing 1100 to move in an optical axis (for example, Z-axis) direction. For example, at least one third ball member 1540 may be disposed between the lens holder 1510 and the housing 1100. The third ball member 1540 may serve as a bearing to guide a movement of the lens holder 1510. In addition, the third ball member 1540 may also serve to maintain a gap between the lens holder 1510 and the housing 1100. The third ball member 1540 may move in a rolling motion or a sliding motion in the optical axis (Z-axis) direction to guide the movement of the lens holder 1510. A seventh guide portion 1561, accommodating the third ball member 1540, may be provided on at least one surface, among surfaces on which the lens holder 1510 and the housing 1100 face each other. The third ball member 1540 may be accommodated in the seventh guide portion 1561 to move in a sliding motion along a shape of the seventh guide portion. In embodiments, the seventh guide portion 1561 may have a shape having a length in the optical axis (Z-axis) direction. In this case, the movement of the third ball member 1540 may be limited in the other axes (X-axis and Y-axis) directions, perpendicular to the optical axis (Z-axis) direction, and permitted in the optical axis (Z-axis) direction while the third ball member 1540 is accommodated in the seventh guide portion 1561. In embodiments, a cross-section of the seventh guide portion 1561 may have various shapes such as a curved shape, a polygonal shape, or the like.

The lens holder 1510 may be pressed toward the housing 1100 such that the third ball member 1540 may be maintained in a state of contact with the lens holder 1510 and the housing 1100. To this end, a third pulling yoke (not illustrated) may be mounted on a bottom surface of the housing 1100 to face the third magnet 1531 mounted on the lens holder 1510. The third pulling yoke (not illustrated) may be a magnetic material. Attractive force may act between the third pulling yoke (not illustrated) and the third magnet 1531. Accordingly, the lens holder 1510 may be moved in the optical axis (Z-axis) direction by the driving force of the third driving part 1530 while being in contact with the third ball member 1540.

The lens holder 1510 may be supported on the housing 1100 by the attractive force between the third pulling yoke (not illustrated) and the third magnet 1531, but the lens holder 1510 may be removed by external force such as external impact to collide with other members inside the housing 1100. Accordingly, in embodiments, a third auxiliary member 1570 may be provided to prevent the lens holder 1510 from moving outside a position thereof and to absorb an impact even when shake occurs due to external force. For example, the third auxiliary member 1570 may be provided to have a 'C' shape, and both ends of the third auxiliary member 1570 may be fitted and fixed to the housing 1100 to cover the lens holder 1510 from above. The third auxiliary member 1570 may further include a damping member formed of an elastic material and provided in various portions to absorb impact. For example, a front or rear end portion in the optical axis direction may be in contact with the third auxiliary member 1570 during a movement of the lens holder 1510 in the optical axis direction. In this case, dampers may be provided on both end portions of the third auxiliary member 1570 to absorb the impact. In embodiments, two third auxiliary members 1570 may be provided to be respectively installed on both sides of the lens holder 1510. Since the third auxiliary member 1570 serves as a stopper or a damper, the lens holder 1510 may be stably driven in the optical axis (Z-axis) direction. Accordingly, the lens module 1500 may perform an autofocusing function or a zoom function.

As described herein, a camera module according to embodiments and a portable electronic device including the same may have a simple structure and may be easily driven while implementing functions such as autofocusing, zoom, shake correction, PIP, and tracking functions.

According to the camera module according to embodiments and the portable electronic device including the same, a path of incident light may be variously changed and a height (or a thickness) of the camera module may be decreased.

While specific examples have been illustrated and described above, it will be apparent after gaining an understanding of this disclosure that various changes in form and details may be made in these examples without departing from the spirit and scope of the claims and their equivalents. The examples described herein are to be considered in a descriptive sense only, and are not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A reflective module assembly comprising:
   a housing comprising an internal space;
   a first reflective module, disposed in the housing, and configured to change a path of incident light; and
   a second reflective module, disposed in the housing, and configured to change a path of light emitted from the first reflective module,
   wherein the first reflective module comprises a first reflective member that is rotatable about a first axis formed by at least two first ball members, and
   wherein the second reflective module comprises:
      a second reflective member rotatable about a second axis, perpendicular to the first axis and passing through a rotation axis ball disposed at the second reflective module, and
      guide balls, spaced apart from the rotation axis ball, and configured to guide a rotation of the second reflective module about the second axis.

2. The reflective module assembly of claim 1, wherein the first reflective module comprises a first holder and the first reflective member is disposed on the first holder,
   wherein the at least two first ball members are disposed between the first holder and the housing to rotatably support the first holder about the first axis,
   wherein the second reflective module comprises a second holder and the second reflective member is disposed on the second holder, and
   wherein the rotation axis ball is disposed between the second holder and the housing to rotatably support the second holder about the second axis.

3. The reflective module assembly of claim 2, wherein the housing comprises a first support portion,
   wherein the first holder comprises a second support portion disposed on both side portions of the first holder in a direction of the first axis and disposed to face the first support portion, and
   wherein the at least two first ball members are disposed between the first support portion and the second support portion to rotatably support the first holder.

4. The reflective module assembly of claim 3, wherein the first support portion comprises a first guide portion supporting the at least two first ball members,
   wherein the second support portion comprises a second guide portion supporting the at least two first ball members in a position facing the first guide portion, and
   wherein at least one of the first guide portion and the second guide portion comprises an internal wall inclined to support the at least two first ball members at three or more points.

5. The reflective module assembly of claim 2, wherein the housing comprises a third guide portion supporting the rotation axis ball,
   wherein the second holder comprises a fourth guide portion supporting the rotation axis ball in a position facing the third guide portion, and
   wherein at least one of the third guide portion and the fourth guide portion comprises an internal wall inclined to support the rotation axis ball at three or more points.

6. The reflective module assembly of claim 2, wherein the guide balls are disposed between the housing and the second holder to guide rotation of the second holder.

7. The reflective module assembly of claim 6, wherein the housing comprises a fifth guide portion supporting the guide balls,
   wherein the second holder comprises a sixth guide portion supporting the guide balls in a position facing the fifth guide portion,
   wherein the guide balls move in a rolling motion in at least one of the fifth guide portion and the sixth guide portion to guide rotation of the second holder.

8. The reflective module assembly of claim 7, wherein at least one of the fifth guide portion and the sixth guide portion comprises a shape of an arc corresponding to a rotation path of the second holder.

9. The reflective module assembly of claim 7, wherein at least one of the fifth guide portion and the sixth guide portion comprises an internal wall inclined to support the guide balls at two or more points.

10. The reflective module assembly of claim 2, wherein a first magnet is disposed on both side surfaces of the first holder in a direction of the first axis,
    wherein a first coil is disposed on an internal sidewall of the housing facing the first magnet, and
    wherein the first holder is configured to be rotated about the first axis by an interaction of the first magnet and the first coil.

11. The reflective module assembly of claim 2, wherein a second magnet is disposed on one surface of the second holder,
    wherein at least one second coil is disposed on a lower surface of the housing facing the second magnet, and
    wherein the second holder is configured to be rotated about the second axis by an interaction between the second magnet and the second coil.

12. The reflective module assembly of claim 11, wherein the second magnet comprises one or more N-poles and one or more S-poles alternately magnetized in a rotational direction of the second holder.

13. The reflective module assembly of claim 1, further comprising:

a blocking member disposed between the first reflective module and the second reflective module to block a portion of incident light.

14. A camera module, comprising:
a lens module; and
a reflective module assembly, comprising:
  a first reflective member rotatable about a first axis and configured to change a path of incident light; and
  a second reflective member rotatable about a second axis and configured to change a path of light emitted from the first reflective member,
  wherein the first reflective member is supported by first spheres forming the first axis, and the second reflective member is supported by second spheres forming the second axis,
  wherein a number of the first spheres, forming the first axis, is different from a number of the second spheres forming the second axis,
  wherein the first axis is parallel to an optical axis of the lens module, and
  wherein the second axis intersects the optical axis of the lens module.

15. The camera module of claim 14,
wherein the lens module comprises:
  a plurality of lenses configured to allow light, emitted from the second reflective member, to pass therethrough; and
  an image sensor on which the light passed through the lens module is incident.

16. A reflective module assembly comprising:
a housing;
a first reflective member disposed in the housing and rotatable about a first axis;
first ball members, disposed between the first reflective member and the housing in a direction of the first axis, and configured to support the first reflective member in a direction perpendicular to the first axis;
a second reflective member disposed in the housing and configured to change a path of light emitted from the first reflective member and rotatable about a second axis perpendicular to the first axis;
second ball members, disposed between the second reflective member and the housing, and configured to support the second reflective member in the direction perpendicular to the first axis; and
a rotation axis ball which forms a rotation axis of the second reflective member,
wherein the rotation axis ball is disposed between the second reflective member and the housing, and is spaced apart from the second ball members.

17. The reflective module assembly of claim 16, wherein two or more first ball members form the first axis, and wherein the second axis passes through the rotation axis ball.

18. The reflective module assembly of claim 17, wherein the housing comprises a first support portion,
  wherein the first reflective member is disposed in a first holder comprising a second support portion disposed on both side portions of the first holder in a direction of the first axis and disposed to face the first support portion, and
  wherein the two or more first ball members are disposed between the first support portion and the second support portion to rotatably support the first holder.

19. A camera module comprising:
the reflective module assembly of claim 16;
a lens module comprising a plurality of lenses and configured to receive light emitted from the second reflective member; and
an image sensor configured to receive light emitted from the lens module and convert the received light into an electrical signal.

* * * * *